(12) United States Patent
Tsukahara et al.

(10) Patent No.: US 7,206,024 B2
(45) Date of Patent: Apr. 17, 2007

(54) ELECTRONIC CAMERA HAVING ROTATABLY COUPLED FIRST AND SECOND BODY SECTIONS

(75) Inventors: Daiki Tsukahara, Tokyo (JP); Tomoaki Kawamura, Kanagawa-ken (JP); Nobuya Kawahata, Kanagawa-ken (JP)

(73) Assignee: Nikon Corporation, Tokyo (JP)

( * ) Notice: Subject to any disclaimer, the term of this patent is extended or adjusted under 35 U.S.C. 154(b) by 808 days.

(21) Appl. No.: 09/843,695

(22) Filed: Apr. 30, 2001

(65) Prior Publication Data

US 2002/0018134 A1 Feb. 14, 2002

Related U.S. Application Data

(62) Division of application No. 09/007,067, filed on Jan. 14, 1998, now Pat. No. 6,295,088.

(60) Provisional application No. 60/057,681, filed on Aug. 29, 1997, provisional application No. 60/056,299, filed on Aug. 29, 1997, provisional application No. 60/056,298, filed on Aug. 29, 1997.

(30) Foreign Application Priority Data

| Feb. 17, 1997 | (JP) | ............................... 9-032164 |
| Jun. 4, 1997 | (JP) | ............................... 9-146364 |
| Jun. 9, 1997 | (JP) | ............................... 9-150840 |

(51) Int. Cl.
*H04N 5/225* (2006.01)

(52) U.S. Cl. ................................. 348/373; 348/375

(58) Field of Classification Search ........... 348/207.99, 348/373, 374, 375, 231.99, 333.01–333.12; 396/246, 535; 386/118, 117
See application file for complete search history.

(56) References Cited

U.S. PATENT DOCUMENTS

| 5,043,822 A | 8/1991 | Ichiyoshi et al. |
| 5,442,453 A * | 8/1995 | Takagi et al. ............... 386/118 |
| 5,548,334 A | 8/1996 | Ichiyoshi |
| 5,664,243 A * | 9/1997 | Okada et al. ............... 396/246 |
| 5,815,205 A * | 9/1998 | Hashimoto et al. ......... 348/373 |
| 6,141,505 A * | 10/2000 | Miyata et al. .............. 396/535 |
| 2004/0027467 A1* | 2/2004 | Shiga .................... 348/231.99 |

FOREIGN PATENT DOCUMENTS

| JP | 61-150474 A | 7/1986 |
| JP | A-61-150474 | 7/1986 |
| JP | 1-106581 A | 4/1989 |
| JP | U-3-94879 | 9/1991 |
| JP | A-7-226870 | 8/1995 |

* cited by examiner

*Primary Examiner*—Tuan Ho
(74) *Attorney, Agent, or Firm*—Oliff & Berridge, PLC

(57) ABSTRACT

The invention provides improved operability for portable electronic devices. A portable electronic device includes a display component and a device aperture component which are mounted on separate segments of the electronic device. Each segment can be rotated with respect to the other, thus permitting a user to photograph an object while adjusting the display to a desired viewing condition.

20 Claims, 17 Drawing Sheets

ELECTRONIC CAMERA HAVING ROTATABLY COUPLED FIRST AND SECOND BODY SECTIONS

This is a Division of application Ser. No. 09/007,067 filed Jan. 14, 1998, now U.S. Pat. No. 6,295,088. The entire disclosure of the prior application is hereby incorporated by reference herein in its entirety.

RELATED PROVISIONAL APPLICATIONS

This nonprovisional application claims the benefit of Provisional Applications Nos. 60/056,299, 60/057,681, and 60/056,298 all filed on Aug. 29, 1997.

INCORPORATION BY REFERENCE

The disclosures of the following priority applications are herein incorporated by reference: Japanese Patent Application No. 9-032164, filed Feb. 17, 1997, Japanese Patent Application No. 9-146364, filed Jun. 4, 1997, and Japanese Patent Application No. 9-150840, filed Jun. 9, 1997.

BACKGROUND OF THE INVENTION

1. Field of Invention

The invention relates to electronic devices such as, for example, electronic cameras. More specifically, it relates to an electronic camera which includes a photographic lens, an optical viewfinder and a screen monitor for monitoring an image to be photographed.

2. Description of Related Art

Advancements in liquid crystal display (LCD) technology now permit LCD screens to be used in portable devices such as digital cameras and PDA's (Personal Digital Assistants) which are even usable outdoors. Improved display operability has meant that LCD displays now appear in many common consumer devices. Although the conventional electronic camera is portable, when it is placed on a tabletop for connection to external devices and peripherals, the camera slants, causing difficulty in viewing the screen and difficulty operating the device.

Conventional digital cameras display object images, which are imaged by an imaging element, such as a CCD, onto a liquid crystal monitor. In these conventional systems, the digital camera is generally separated from the user when taking pictures so that the user can observe the liquid crystal monitor. For example, the digital camera may be positioned higher or lower than the user's viewing level, which may make it difficult to properly depress and operate operating buttons.

In response to this problem, some conventional electronic cameras include a camera body partitioned into a main body section, which houses the photographic elements and optical system, and a display section that includes the display monitor. The display monitor is attached so that it is capable of rotating around an axis perpendicular to the optical axis even if the main camera body section attached to the liquid crystal monitor is small.

FIG. 6 shows a conventional electronic camera which includes an electronic camera main body 61 and display component main body 62 which are formed as parallelepipeds having the same shape and same size and are oriented so that their side surfaces 61a and 62a abut. The main body 61 and display component main body 62 are connected by a rotating joint and thus rotate freely around an axis perpendicular to the side surfaces 61a and 62a.

An imaging element, a lens unit having a lens aperture 63 located on the side surface 61b adjacent to side surface 61a and a motor are installed inside the camera main body 61.

Inside the display component main body 62, an LCD external display device is disposed in a manner so that it is positioned on the top surface 62c. The LCD displays images output from the electronic camera main body 61 as well as menu settings and a listing of camera functions.

The conventional electronic camera shown in FIG. 6 also includes an IrDA aperture 65 which is positioned on the side surface 62b, adjacent to the side surface 62a and the top surface 62c of the display component main body 62. The IrDA aperture facilitates transmission of image information to, e.g., a personal computer and/or television and allows remote operation of/by a personal computer via standard infrared communication.

The rotating joint described earlier includes cylindrical members fixed to the centers of the side surfaces 61a and 62a and which have matched axes in a direction perpendicular to the side surfaces 61a and 62a. The cylindrical members are coupled so as to be capable of rotation. In the hollow center of the cylindrical members, a contact lead is inserted for connecting the constituent elements inside the display component main body 62 and the constituent elements inside the electronic camera main body 61. An intermittent rotating mechanism is provided in the coupled section, and the display component main body 62 and camera main body 61 can be set to the desired angle by rotating the display component main body 62 with respect to the camera main body 61.

In operation, a user holds the display component main body 62 or the electronic camera main body 61 in one hand. The lens aperture 63 can be pointed at objects above and below the user's eye level while viewing the object with the LCD display window 64 by turning the electronic camera main body 61 in the direction of the object to be imaged with respect to the display component main body 62.

When operating the electronic camera, a grip is generally formed on either the display component main body 61 or the electronic camera main body 62 in order to hold the device stably. As shown by the dotted lines in FIG. 6, the grip section may protrude from the bottom surface 62d which is the surface opposite the top surface 62c or on the bottom surface 61d which is the surface opposite surface 61c and perpendicular to the side surface 61b on which the lens aperture 63 is formed.

In order to implement the rotatable display, additional design conditions must be considered focusing on the difficulty of operating the digital camera controls and effectively controlling vibration (e.g., due to hand shaking).

FIG. 19 shows a conventional electronic device including a display unit 42 having a liquid crystal display device (LCD) joined with an imaging unit 41 on which a shooting lens and an imaging device are positioned in a manner so that the display unit 42 rotates freely relative to the imaging unit 41. This particular device may function as a video camera or digital still camera.

This type of electronic camera permits a user to image an object while observing the object on a display screen as well as locations above or below the object in order to verify the image position.

In operation, a user supports the electronic camera by holding the imaging unit 41 with a right hand 43, and performs imaging of the object by directing the shooting lens in a desired direction.

Conventional electronic cameras generally position the display unit on a top face which is the widest surface of the camera, while the imaging unit is positioned on a side face where the palm of the right hand makes contact. This configuration makes storage difficult, particularly because the display unit and imaging unit are not rotatable relative to one another. Where the electronic camera includes a zooming function, the lens unit extends in the direction of the optical axis creating an addition to the imaging unit 41.

Conventional digital cameras, which include zoom lenses are often tall and narrow in shape or narrow and flat, like a pair of binoculars. This configuration permits all of the camera elements to be positioned in a functional manner. However, unlike binoculars, which are only for viewing objects, it is helpful to the operation of a digital camera if the display monitor can be rotated relative to the photographic optical axis.

SUMMARY OF THE INVENTION

The invention provides an electronic device and display unit (e.g., an electronic camera) with superior operability when used as a portable device or on a desktop.

According to one aspect of the invention, a portable electronic device includes a display component main body which has a first surface and a first side surface which is smaller than the first surface. A device display device is positioned on the first surface. A device main body includes a second side surface, which is about the same height as the first side surface, mounted to the first side surface so that the first and second side surfaces rotate freely with respect to each other about an axis of rotation. A grip section is provided as a projection on a surface of the display component main body that faces in a direction opposite of the first surface. The distance between the axis of rotation and a third side surface that intersects the second side surface of the device main body is equal to the distance between the axis of rotation and the surface of the grip on the display component main body.

The portable electronic device can include an aperture for transmitting and receiving electromagnetic waves for wireless communication. The aperture can be formed on any surface perpendicular to the third side surface of the portable device main body or on any surface which is perpendicular to the first surface on the display component main body.

The portable electronic device also can include an operating button for the external display device and an operating button for wireless communication disposed on the first surface of the display component main body.

The display component main body and the portable device main body may be formed roughly as parallelepipeds having roughly the same shape and same size. The main body of the portable device can be an electronic camera having a lens aperture on a side surface which is adjacent to the second side surface.

With the above structure, an operator can support the display component main body by gripping the grip portion and can slant the portable device main body to any angle in relation to the display component main body. This facilitates visual recognition of the screen on the external display device on the display component main body and ease of use on a tabletop.

If the display device is placed on a tabletop, the aperture preferably is positioned perpendicular to the tabletop. Thus, when performing wireless communication, the aperture will face the device with which information is being transferred. This aperture position assures high quality transmission.

According to another aspect of the invention, the grip section is provided as a projection on a fourth surface. The fourth surface is a surface that intersects the second side surface of the portable device main body. Utilizing the grip section, in the same manner described above, visual recognition of the screen displayed by the external display device on the display component main body and operation of the portable device can be performed successfully.

When the distance between the axis of rotation and a fifth side surface, which is a surface that intersects the first surface and the first side surface of the display component main body, is made equal to the distance between the axis of rotation and the surface of the grip on the portable device main body, the fifth side surface and the surface of the grip can be located on a single plane perpendicular to the first surface by rotating the portable device main body in relation to the display component main body. Accordingly, if the device is placed on a tabletop, it becomes possible to keep the first surface roughly perpendicular to the surface of the tabletop, and visual recognition of the screen and use of the portable device on the tabletop become simplified.

The wireless communication aperture can be formed on any surface perpendicular to the fifth side surface on the display component main body or on any surface perpendicular to the fourth surface of the portable device main body. Thus, the aperture is positioned perpendicular to the tabletop when the device is placed so that the grip of the portable device main body is in contact with the tabletop.

The portable device main body can have a lens aperture on either of the side surfaces located adjacent to the second side surface, which makes it possible to image an object in a desired direction while viewing the object on the screen. Also, because it can be placed in the same manner as portable devices with display units, it is possible to view the photographed images and to perform all the operations of the electronic camera on a tabletop.

The electronic camera according to this embodiment of the invention can also accommodate a zoom lens whereby vibrations during zoom operation are prevented due to a reliable grip which provides stability.

According to another aspect of the invention, an electronic camera includes an imaging unit main body and a display unit main body. The imaging unit main body includes a first face and a first side face which is perpendicular to the first face. The display unit main body includes a second face and a second side face which is perpendicular to the second side face. The second face includes an external display apparatus which displays images. The imaging unit main body and display unit main body are joined at the first side face and the second side face whereby the imaging unit main body and the display unit main body rotate freely with respect to each other. In this configuration, a lens unit optical axis and an optical viewfinder unit optical axis are lined up in the direction of (i.e., parallel to) the first side face.

The lens unit can be closer to the first side face than is the optical viewfinder, or vice versa.

According to another aspect of the invention, a rotary operation member is provided which is capable of rotary operation in a scrolling direction of the display screen of the external display apparatus of the display unit main body. The rotary operation member is provided on a portion of the second surface located opposite the second side surface.

With this structure, the width of the side faces may correspond to the diameters of the apertures of the lens unit and the optical viewfinder unit. Hence, the imaging unit main body may be formed into a thin, flat shape where the side faces are smaller than the first face.

The display unit main body also is formed in a thin, flat shape where the side faces are smaller than the second face which displays an image. Hence, the overall shape is simplified.

Moreover, a high level of stability is achieved by arranging the lens unit, which is the heaviest component, in the vicinity of the rotary parts so that the entire apparatus may be supported by the display unit main body with one hand, while supporting the imaging unit main body with the other hand. Additionally, by arranging the aperture of the lens unit in the vicinity of the rotary part, which is farthest from the support position (the location grasped by the user), the probability of imaging failure due to obstructions, such as a user's hand covering the aperture is minimized.

An electronic flash unit also can be positioned side by side with the optical viewfinder unit, between the optical viewfinder unit and the face that faces in the opposite direction of the first side face of the imaging unit main body. In other words, the lens unit, optical viewfinder and the electronic flash unit are positioned side by side in a narrow section between the first face and its oppositely facing face. This facilitates flash shooting of a still photo while maintaining the imaging unit main body in a shape where the side faces are smaller than the first face.

In this configuration, the aperture of the electronic flash unit is positioned with at least the width of the aperture of the optical viewfinder unit away from the aperture of the lens unit. Hence the probability of the occurrence of red-eye is reduced when shooting images with a flash.

Also, with this arrangement, the electronic flash unit and the lens unit are separated by the optical viewfinder unit. Thus, noise interference, which interferes with the image information and is caused by the emission of flash, may be prevented.

A display window for displaying the state of the electronic camera or a setting button which sets the control state of the electronic camera also can be provided. Both are arranged in a position over the lens unit in the first face. In short, the setting button and/or the display window may be positioned in the vicinity of the rotary part in the first face of the imaging unit main body.

In general, the control state of the electronic camera is determined before imaging. Thus, the operation of the setting button during imaging should be avoided. Moreover, touching the display window should be avoided because it causes soiling with finger prints, for example. Thus, by holding the imaging unit main body from the opposing face of the first side face during imaging, the probability of the user's fingers touching the display window and the setting button, which are positioned near the rotary part and away from the position of support, is reduced.

The display window and the setting button of the electronic camera can be arranged side by side in the direction of the imaging optical axis of the lens unit in the first face. The direction of the imaging optical axis is the same as the length direction of each unit. This arrangement is the most reasonable positional relationship when the display window and the setting button are arranged in the vicinity of the rotary part.

The imaging button or a zooming button or both may be positioned close to the face that faces opposite from the first side face from the position where the display window or the setting button is arranged in the first face.

Both the imaging button and the zooming button may be used during imaging. Thus, a user needs to operate these buttons during imaging while supporting the imaging unit main body. Both the operation of the buttons and support of the imaging unit main body are reliably performed and imaging is executed by placing the fingers in the vicinity of these buttons in the first face and by holding the imaging unit main body from the face opposite from the first side face, i.e., the opposing face of the side face where the lens aperture is formed. Moreover, because the display window and the setting button are arranged closer to the rotary part than the imaging button and the zooming button, the probability of fingers touching the lens is very small as long as shooting is executed while the imaging unit main body is held in the manner described above.

Additionally by positioning the rotary operation member, which switches the screen display of the external display apparatus, in the vicinity of the face that is opposite the second side face of the display unit main body, the user is able to execute rotary operation of the rotary operation member while holding the display unit main body.

The direction of the rotary operation of the rotary operation member coincides with the direction of scrolling of the display screen. Thus, the user is able to scroll the display screen intuitively in the desired direction.

The imaging unit main body and the display unit main body of the electronic camera may also be formed at about the same shape and size, and in nearly box shapes. This assures balance between the two segments and simplifies the overall shape to a box-like shape when the first face of the imaging unit main body and the second face of the display unit main body are not rotating relative to each other.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
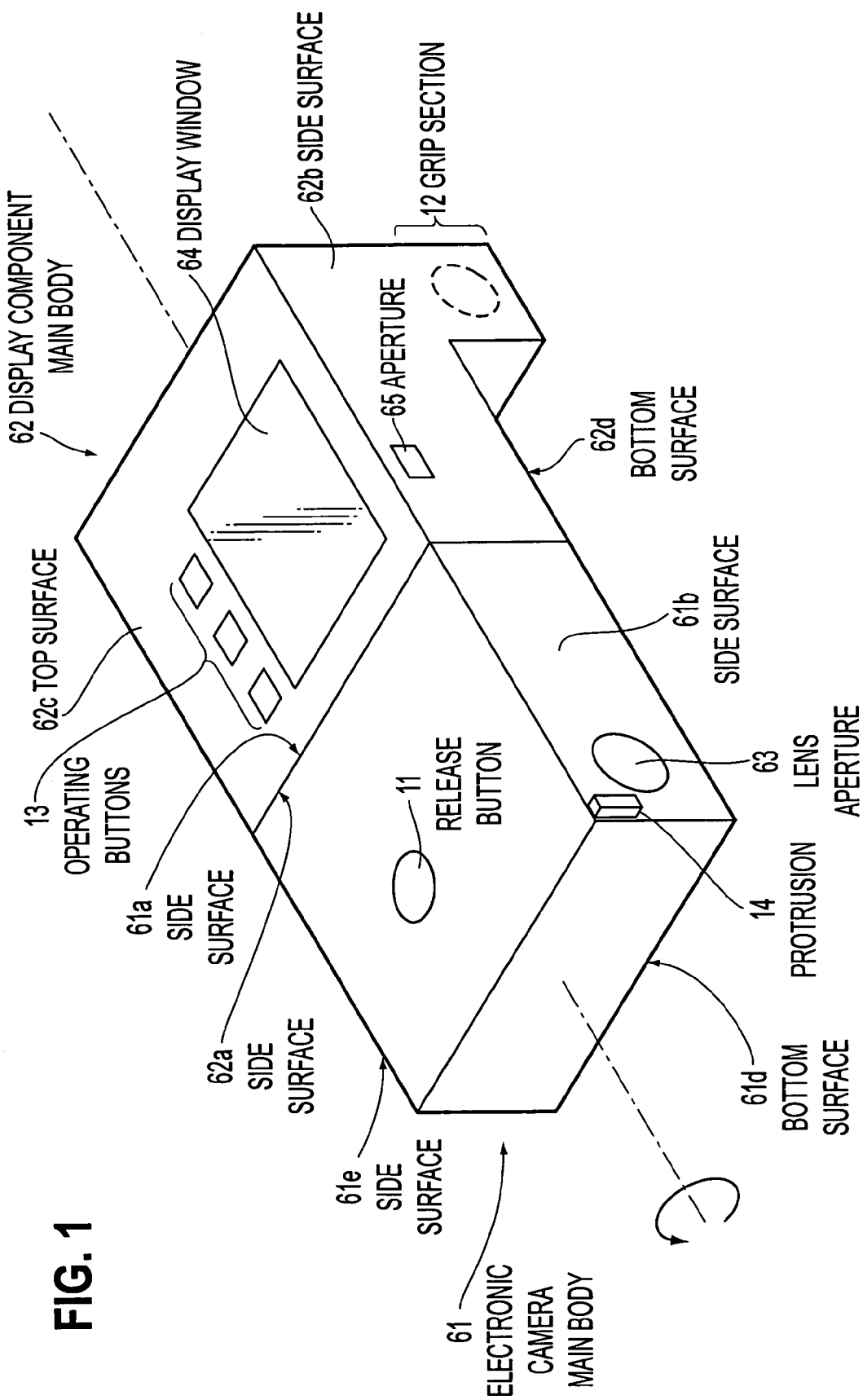
FIG. 1 is a perspective view of the electronic camera according to an embodiment of the invention.

FIG. 1 is a perspective view of an electronic camera according to an embodiment of the invention. FIG. 1 shows the display component main body 62 and the electronic camera main body 61 which are positioned so that the side surfaces 62a and 61a extend vertically in a height direction. In the following description, like elements from the FIG. 6 conventional camera have the same symbols.

With respect to FIGS. 1–5, the LCD 64 corresponds to the external display device, the top surface 62c corresponds to a first surface, side surface 62a corresponds to a first side surface, side surface 61a corresponds to a second side surface, and side surface 61e opposes side surface 61b, which corresponds to a third side surface.

Figure 6:
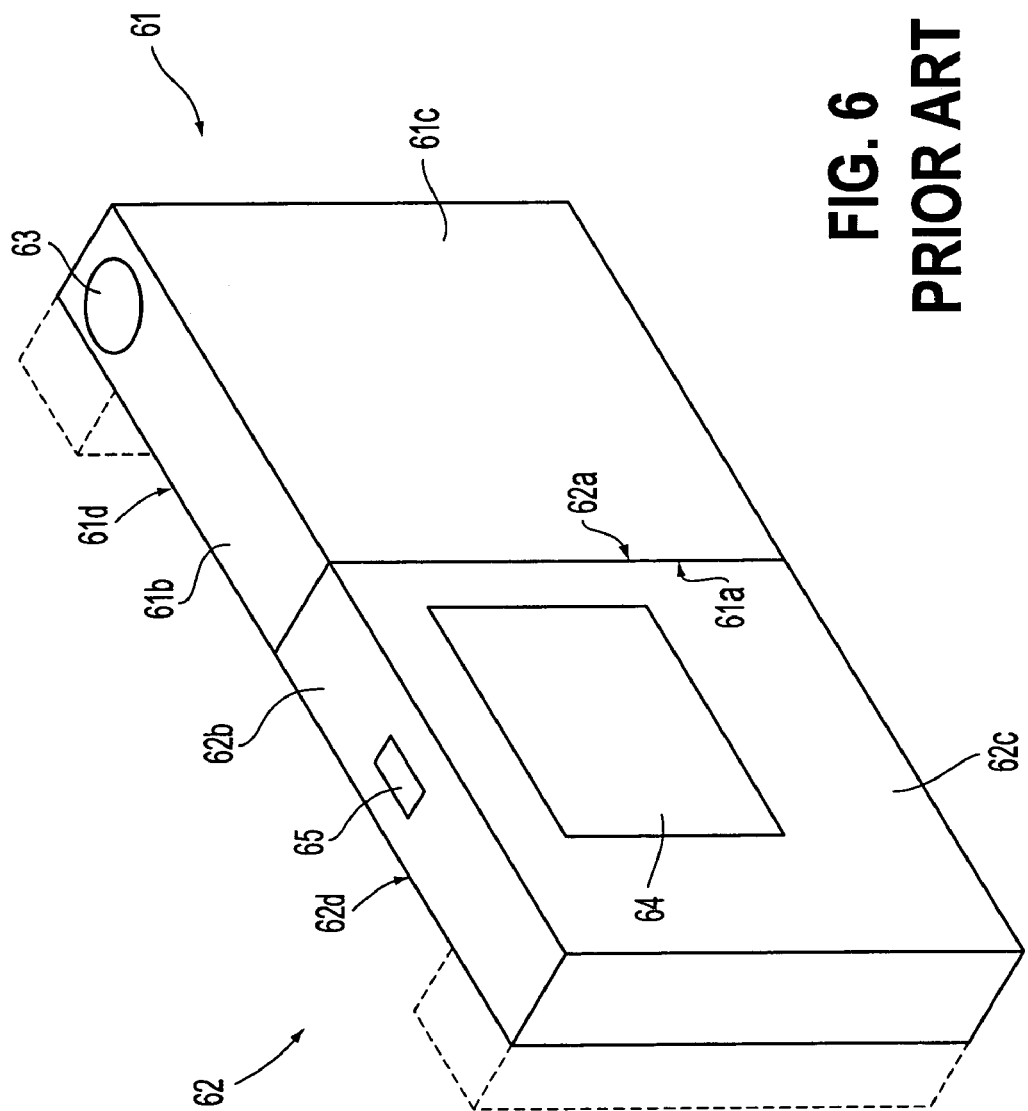
FIG. 6 shows a conventional electronic camera with a display.

One difference between the conventional device shown in FIG. 6 and the embodiment shown in FIG. 1 is that a grip section 12 projections from the bottom surface 62d (the side facing opposite surface 62c) of the display component main body 62. Also, a release button 11 is disposed on the top surface 61c of the electronic camera main body 61, and a small protrusion 14 is formed in the vicinity of the lens aperture 63 on the side surface 61b and adjacent to the surface 61d facing opposite the side surface 61a. This small protrusion 14 is provided as an impediment which prevents the lens aperture 63 from being covered by a user's hand. Also, operating buttons 13 are disposed on the top surface 62c of the display component main body 62. The operating buttons 13 are a group of buttons for operating the LCD or facilitating communications with external machines. For example, the operating buttons can also transmit image information to external machines such as personal computers by IrDA standard infrared communication.

During photography, a user holds the display component main body 62 by grasping the grip section 12 with one hand and points the lens aperture 63 in the desired direction by rotating the electronic camera main body 61. Because the angle of the electronic camera main body 61 in relation to the display component main body 62 can be fixed using an intermittent rotation mechanism (e.g., a bidirectional ratcheting mechanism) on the rotating joint, errors caused by a user's hand shaking can be prevented by stabilizing the display component main body 62. Accordingly, operability during portable use is improved by the configuration of the grip.

Next, tabletop use of the electronic camera is explained. The electronic camera may be placed on top of a table for viewing photographed images and for connecting to external devices.

Figure 2:
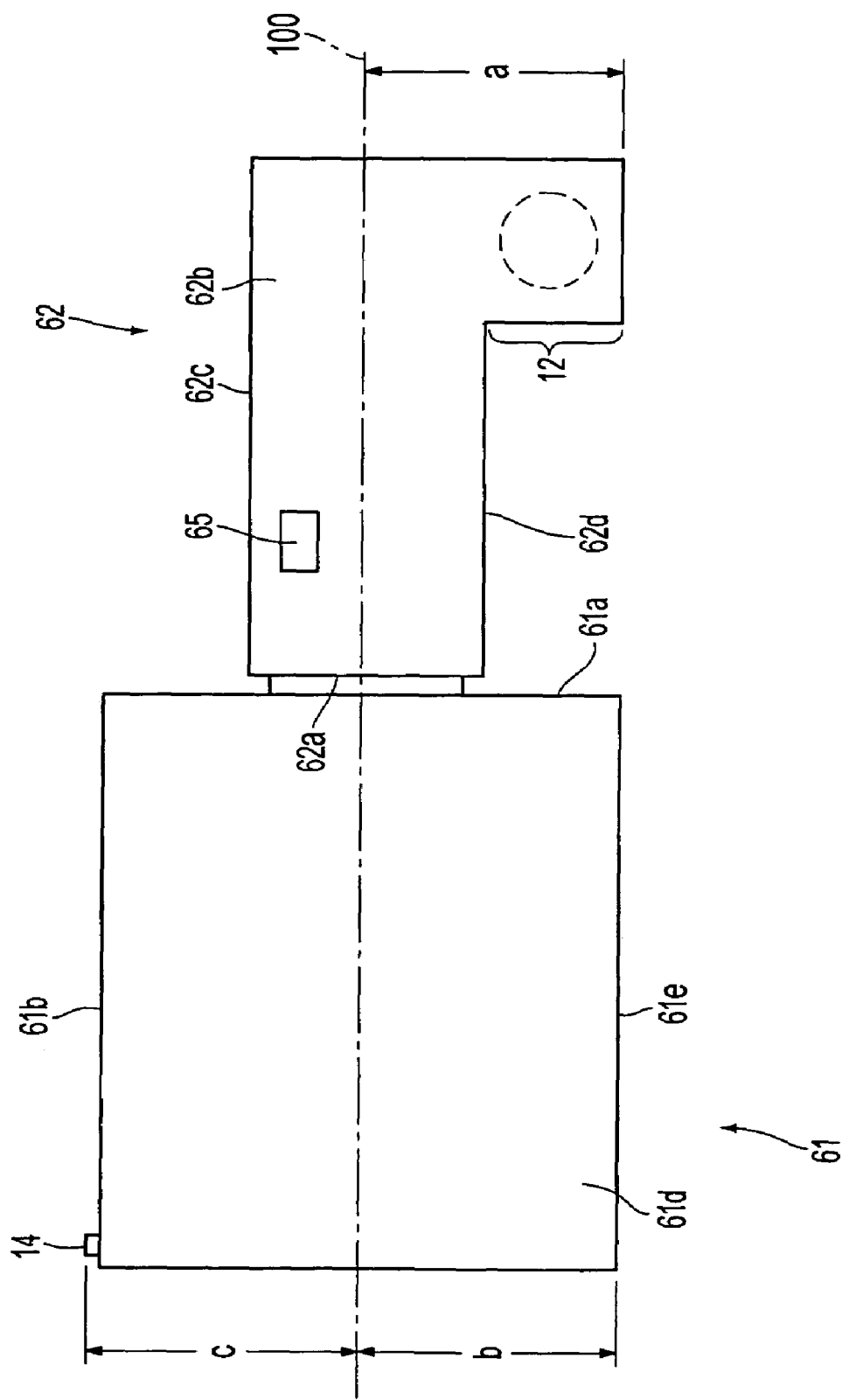
FIG. 2 is a perspective view of the FIG. 1 electronic camera illustrating separability of components according to an embodiment of the invention.

FIG. 2 shows the interconnection between components of the electronic camera. FIG. 2 shows the electronic camera main body 61 rotated 90° from the position shown in FIG. 1 in the direction of the arrow around the axis 100 shown by the dotted lines. In this configuration, the distance "a" from the surface of the grip 12 to the axis 100 is equal to the distance "b" from the side surface 61e of the electronic camera main body 61 to the axis 100.

Figure 3:
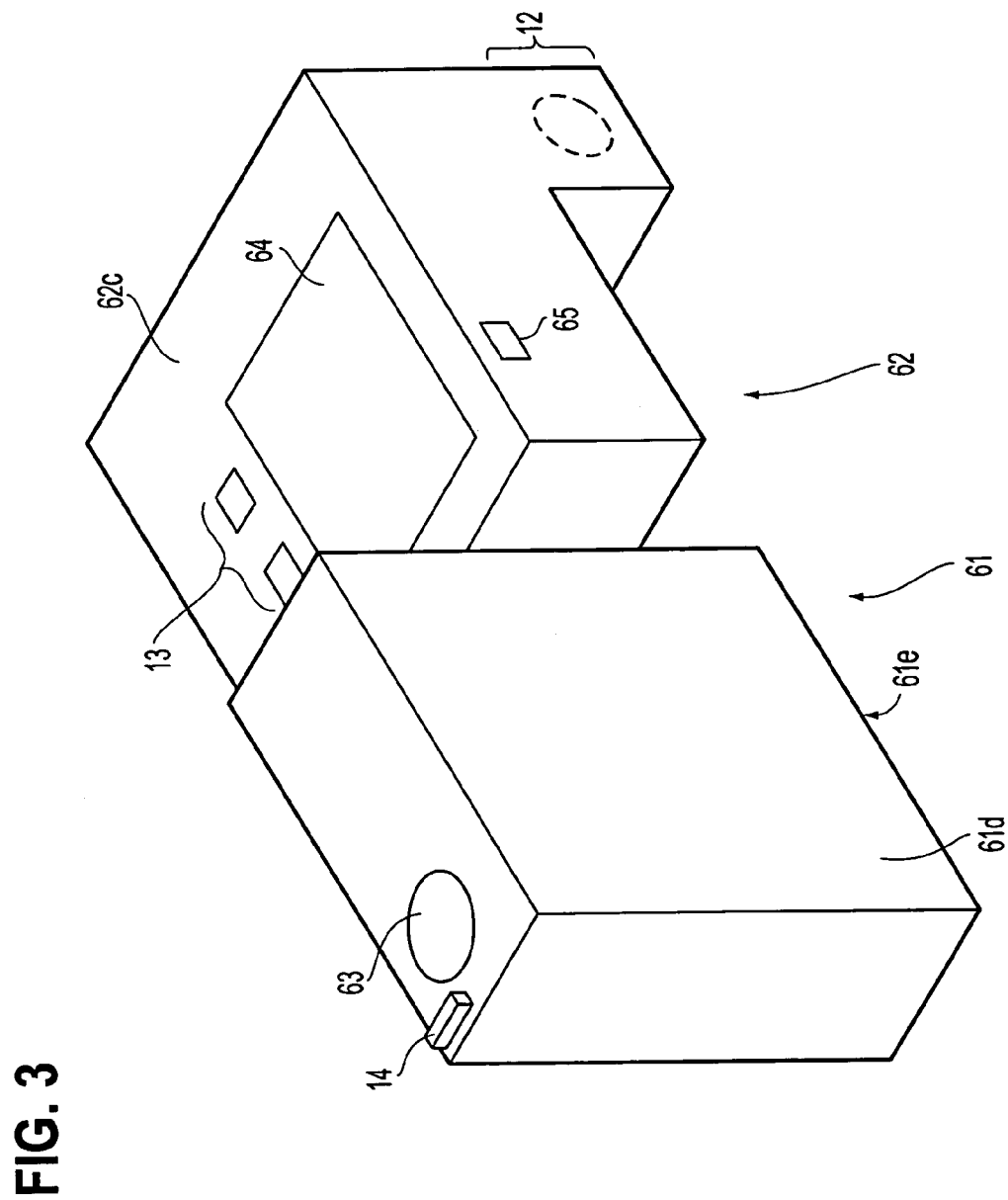
FIG. 3 is a perspective view of the FIG. 1 electronic camera placed on a tabletop.

FIG. 3 shows the FIG. 1 electronic camera configured as if positioned on a tabletop. During tabletop use, the electronic camera is positioned by turning the top of the grip 12 by 90° with respect to the electronic camera main body. Because the top of the grip 12 and the side surface 61e become positioned in the same plane with respect to length as shown in FIG. 2, the electronic camera is stably positioned on the flat tabletop surface.

In this position, the LCD display window 64 is level and faces upwards and the IrDA aperture 65 is perpendicular to the surface of the tabletop. Thus, photographed images can be viewed by several viewers because the screen is directed upwards. In addition, infrared communication is facilitated because the IrDA aperture 65 can face the other devices of communication in a straight line. In addition, because the operating buttons 13 are disposed on the top surface 62c, the buttons are easily accessible permitting easy operation of the buttons for wireless communication and for switching of display screens without disturbing the stability of the device. Thus, operability during both portable and tabletop use is assured.

If the electronic camera main body 61 is reversed at an angle of rotation −90° and placed by turning the lens aperture 63 downward, the same effect of operation as described above with reference to FIG. 2 is obtained because the distance "c" from the axis of rotation to the surface of the small protrusion 14 is equal to the distance "a".

Figure 4:
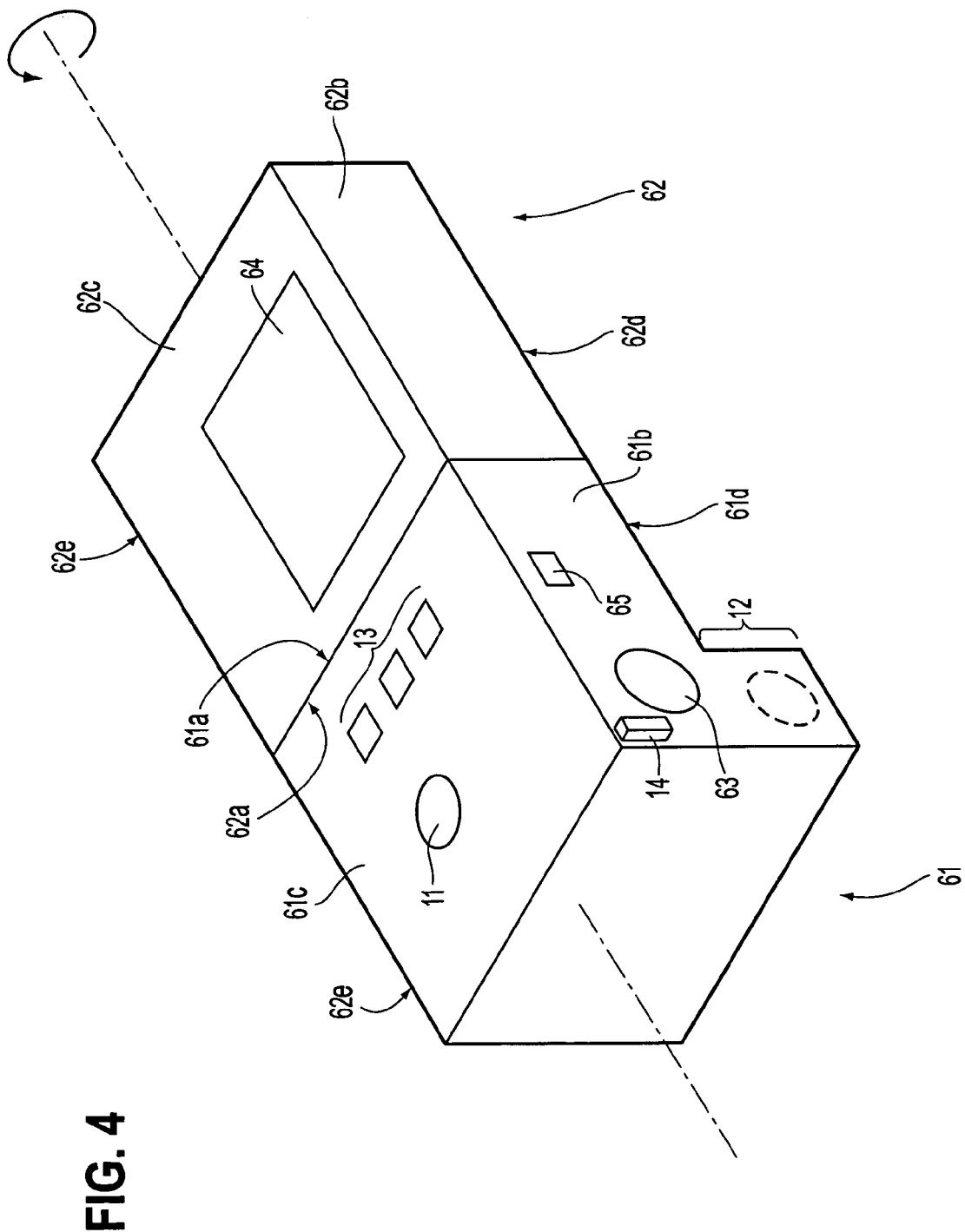
FIG. 4 is a perspective view of the electronic camera according to another embodiment of the invention.

FIG. 4 is a perspective view of the electronic camera according to another embodiment of the invention. In contrast to the embodiment described above, the grip section 12 is formed on the bottom surface 61d (i.e., fourth surface) of the electronic camera main body 61 and the IrDA aperture 65 is disposed on the side surface 61b of the electronic camera main body 61. The operating buttons 13 are disposed on the top surface 61c of the electronic camera main body 61. Also, the distance from the side surface 62e (i.e., fifth side surface), which is the surface opposite the side surface 62b, to the axis of rotation is equal to the distance from the surface of the grip section 12 to the axis.

In operation, the electronic camera is stabilized by using grip section 12, and mistakes in photography due to shaking of the hand are prevented just as in the previous embodiment even though this embodiment differs with respect to how the operator holds the electronic camera main body 61.

Figure 5:
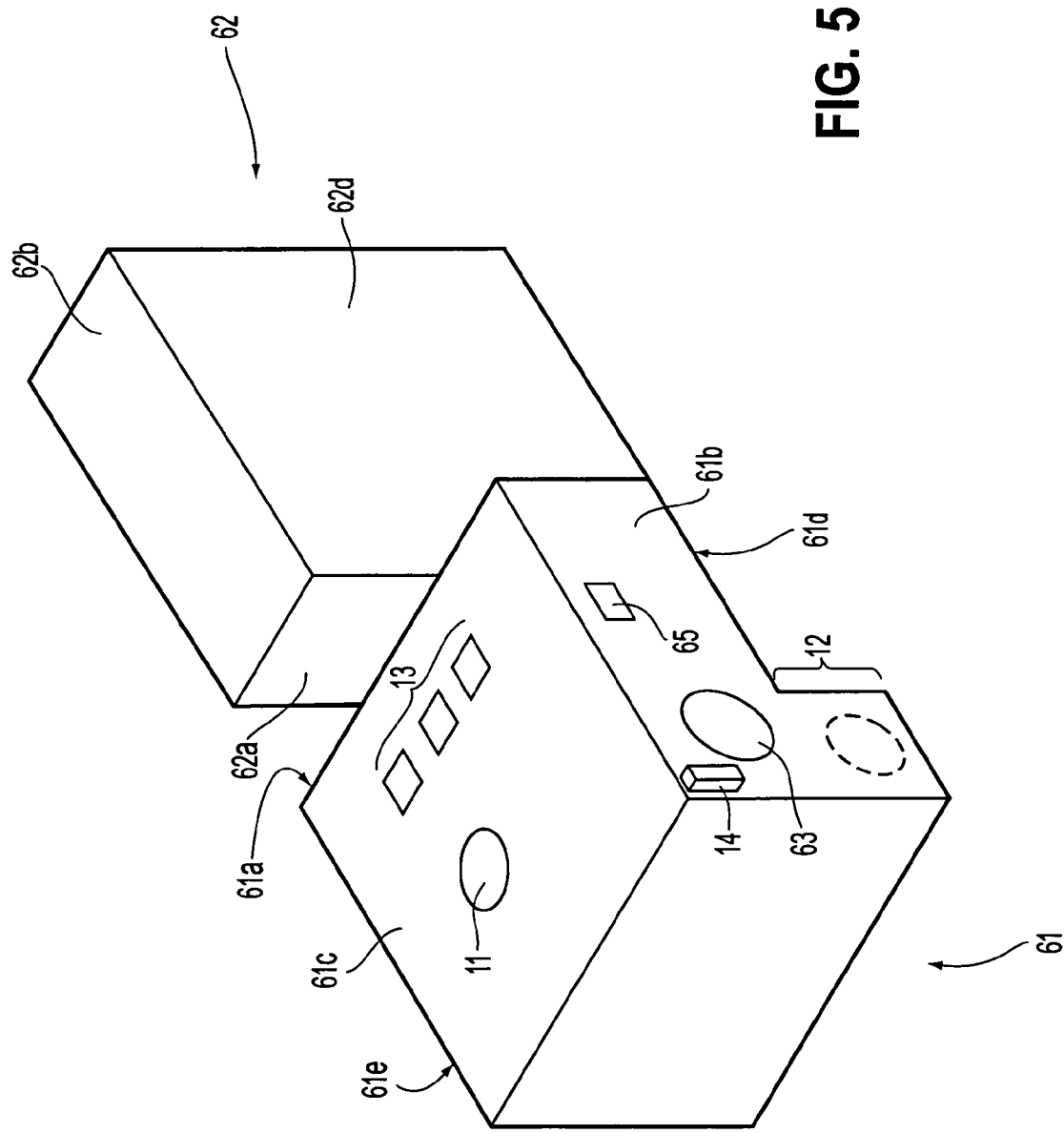
FIG. 5 is a perspective view of the FIG. 4 electronic camera when placed on a tabletop.

Usage and placement of the electronic camera according to the present embodiment is described as follows with reference to FIG. 5.

When placed on top of a table, the display component main body 62 is rotated 90° in relation to the electronic camera main body 61. Thus, the surface of the grip section 12 of the electronic camera main body 61 and the side surface 62e of the display component main body 62 are placed in contact with the tabletop. Both are positioned on the same plane by predefined length relationships, and therefore, the electronic camera is positioned stably on the tabletop.

In this position, the LCD display window 64 and IrDA aperture 65 are both perpendicular to the surface of the tabletop. Thus, a user can view images and perform infrared communication by turing the screen toward the user and turning the IrDA aperture 65 in the opposite direction. Furthermore, because the operating buttons 13 are disposed on the top surface 61c, the buttons 13 are easily viewed and accessible so that operations such as infrared (or other wireless) communication and switching of display screens can be performed while maintaining the stability of the machine.

Accordingly, in the present embodiment, operability during portable and tabletop use can be assured in the same manner as the embodiment previously described.

In each of the embodiments described above, if a battery loading chamber is provided in the grip section 12, as shown by the dotted lines in FIG. 1–5, stability is increased because the center of gravity during tabletop use moves to the bottom of the machine due to the position of the battery.

In the two embodiments described above, the IrDA aperture is disposed on either side surface 62b or side surface 61b, respectively. However, the aperture may be disposed on any surface if it is a surface perpendicular to the surface placed in contact with the tabletop and is a surface capable of facing an external machine.

In each of the embodiments described above, the grip section 12 was configured as a fixed projection. However, the grip section 12 may also be removable. For example, a guide groove and protrusion or hook and pit, can be formed in the grip section 12 and the surface (e.g., 61d or 62d) contacted by the grip section 12. This facilitates easier storage because if the grip 12 is removed, the device has a flat level shape.

In each of the embodiments described above, the external display device main body and camera main body were shaped as parallelepipeds of roughly the same shape and same size and the grip was made columnar. However, the components may be any shape if the distance from a specified part to the axis of rotation satisfies a specified condition. For example, each surface is not limited to a flat surface, but may also be a curved surface.

In each of the embodiments described above, the device was placed in contact with the tabletop. However, the device may be placed in point contact by providing protrusions on the surface placed in contact with the tabletop. Because it is easy to satisfy a specified length relationship by micro-adjusting the length of the protrusions, stability of the device can be maintained.

In each of the embodiments described above, a device in which a component main body and the electronic camera main body are rotated with respect to each other was described. However, the main components of the electronic camera may be contained in the display component main body whereby only the photographic lens rotates.

In each of the embodiments described above, a still camera was described, however a video camera and/or PDA may be configured as described above. A PDA generally has the functions of a notepad, dictionary, telephone, and fax, for example, and is capable of pen input where the display screen acts as a touch tablet and/or touch panel. Furthermore, the invention can also be applied to a PDA with an electronic camera attached externally.

Therefore the invention provides an electronic camera in which, because a grip is provided as a projection on either a portable device main body or on a display component main body which is connected to rotate freely, both visual recognition of the display and operation of the portable device can be successfully performed. Also, because the length relationships of the components placed in contact with the tabletop are optimum when positioned by rotating both relative to the other, visual recognition of the screen and use of the portable machine on top of the table becomes easy.

The invention also permits high quality wireless communication because an aperture for wireless communication is positioned perpendicular in relationship to a tabletop.

Also, because the direction of the operating buttons becomes vertical when placed on top of a table, the operating buttons are easily read and are accessible, thus permitting wireless communication or operation of the buttons to be performed while maintaining device stability.

Also, because the display component main body and the device main body are formed as parallelepipeds of roughly the same shape and same size, balance of the device is maintained. Furthermore, because it can be positioned on a flat tabletop surface, it is possible to easily view photographed images and perform all the operations of the electronic camera.

Figure 7:
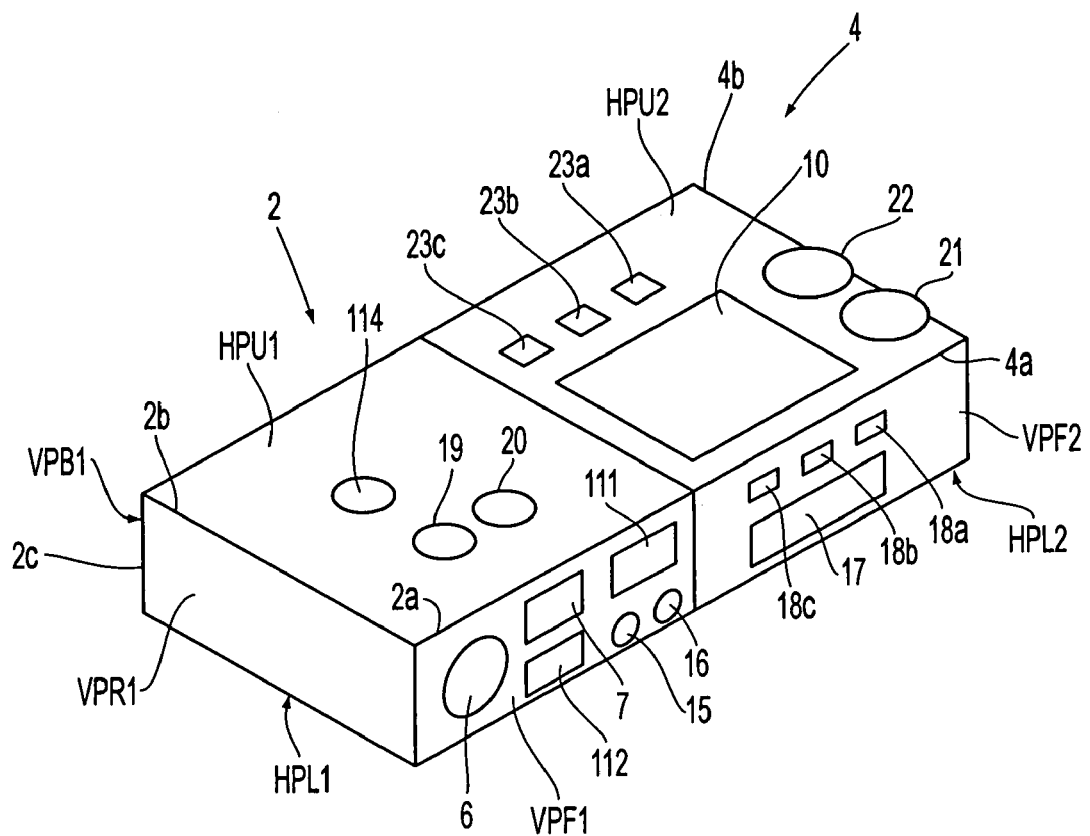
FIG. 7 is a perspective view of an electronic camera according to another embodiment of the invention.

FIG. 7 is a perspective view of the front surface of an electronic camera according to another embodiment of the invention. The electronic camera may be formed as a binocular-type device with thin, long sides. The electronic camera has a first main body section 2 and second main body section 4. Viewed from the optical viewfinder window 24 (FIG. 8), the right section is the first main body section 2, and the left section is the second main body section 4.

Figure 8:
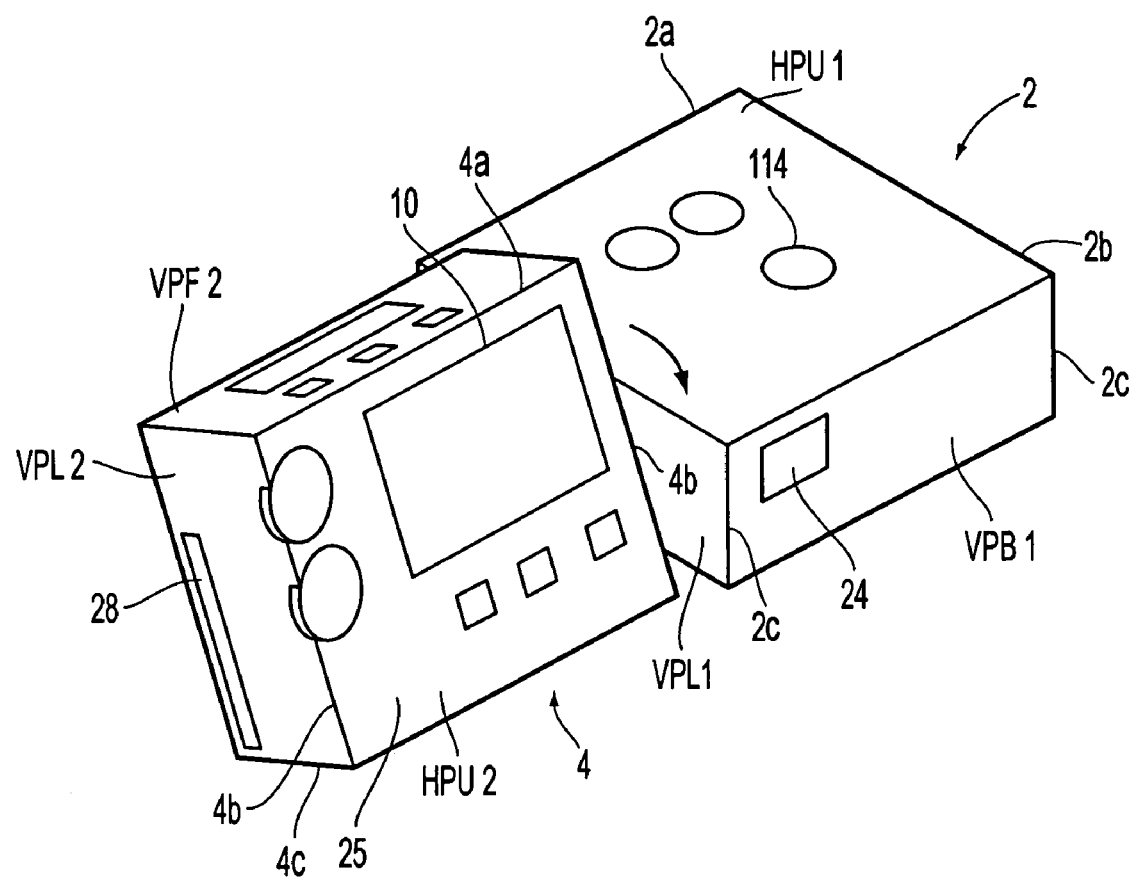
FIG. 8 is a perspective view of rear surface of the FIG. 7 electronic camera.

As shown in FIGS. 7 and 8, the first main body section 2 is formed as a right-angled parallelepiped which has thin, long sides defined between upper and lower surfaces HPU1 and HPL1. The surfaces HPU1 and HPL1 are defined between a first edge 2a, i.e., an edge extending in the left-right direction, which is longer than a second edge 2b extending in the (front-back) direction of the optical axis. Front and rear perpendicular surfaces VPF1 and VPB1 are defined between the first edge 2a and a third edge 2c, which extends vertically. Left and right perpendicular surfaces VPL1 and VPR1 are defined between the second edge 2b and the third edge 2c. In other words, surfaces HPU1 and HPL1 can be said to extend in respective upper and lower horizontal planes, while surfaces VPF1, VPB1, VPR1 and VPL1 extend in front, back, right and left vertical planes, respectively. Surfaces HPU1 and HPL1 are defined by (delimited by) edges 2a and 2b that extend left-right and front-back, respectively. Surfaces VPF1 and VPB1 are defined by (delimited by) edges 2a and 2c that extend left-right and up-down, respectively. Surfaces VPR1 and VPL1 are defined by (delimited by) edges 2b and 2c that extend front-back and up-down, respectively.

A photographic lens aperture 6, an optical viewfinder window 7, a range finder window 112 of a passive focus detection device, for example, a light emission window 111 of a flash device, a window 15 which irradiates AF auxiliary light of the passive focus detection device, and a display window 16 are positioned in the surface VPF1.

Display window 16 provides an external visual report, e.g., via LED light, corresponding to the digital camera operation, for example, when red-eye reduction is selected or when a self-timer is activated. Also, on the upper surface HPU1, a release button 114 and zoom buttons 19 and 20 are positioned. Furthermore, as shown in FIG. 8, an optical viewfinder window 24 is provided on the rear surface VPB1.

As shown by FIGS. 7 and 8, a second main body section 4 is formed as a right-angled parallelepiped which has thin, long sides defined between upper and lower surfaces HPU2 and HPL2, which are defined between the first edge 4a (left-right) and the second edge 4b (front-back). Front and back surfaces VPF2 and VPB2 are defined between the first edge 4a and third edge 4c (up-down). Left and right surfaces VPL2 and VPR2 are defined between the second edge 4b and third edge 4c.

Operation buttons 18a–18c and liquid crystal display section 17 are positioned at rear surface VPF2. Operation buttons 18a–18c are operated to set and release the photographic modes of the digital camera. Display section 17 displays all types of photographic information from the digital camera. The photographic information includes mode setting conditions and photographic frame numbers, for example. Also, on the upper surface HPU2, a liquid crystal screen monitor 10, select dial 21, set dial 22, and operation buttons 23a–23c are positioned. Select dial 21 is operated for on-off switching of the photographic recording mode, the reproduction (replay) mode, and the power supply switch. Set dial 22 switches the electronic camera to either a fine (high-resolution) mode whereby the photographed image has a fine texture or a normal mode where the picture quality is rough (low resolution), but whereby a large number of frames may be photographed. Operation button 23a is the light point erasure button for screen monitor 10, and operation buttons 23b and 23c are the operation buttons for selecting the photometry method and for selecting reproduction of the picture image.

The first edges 2a and 4a of the first main body section 2 and second main body section 4 are about 40–80 mm long, for example, the second edges 2b and 4b are about 60–90 mm long, for example, and the third edges 2c and 4c are about 25–45 mm long, for example. The first main body section 2 and second main body section 4 have an axis of rotation about which they can rotate relative to each other. The axis of rotation is formed at approximately the center of the left and right surfaces VPL1 and VPR2.

Figure 9:
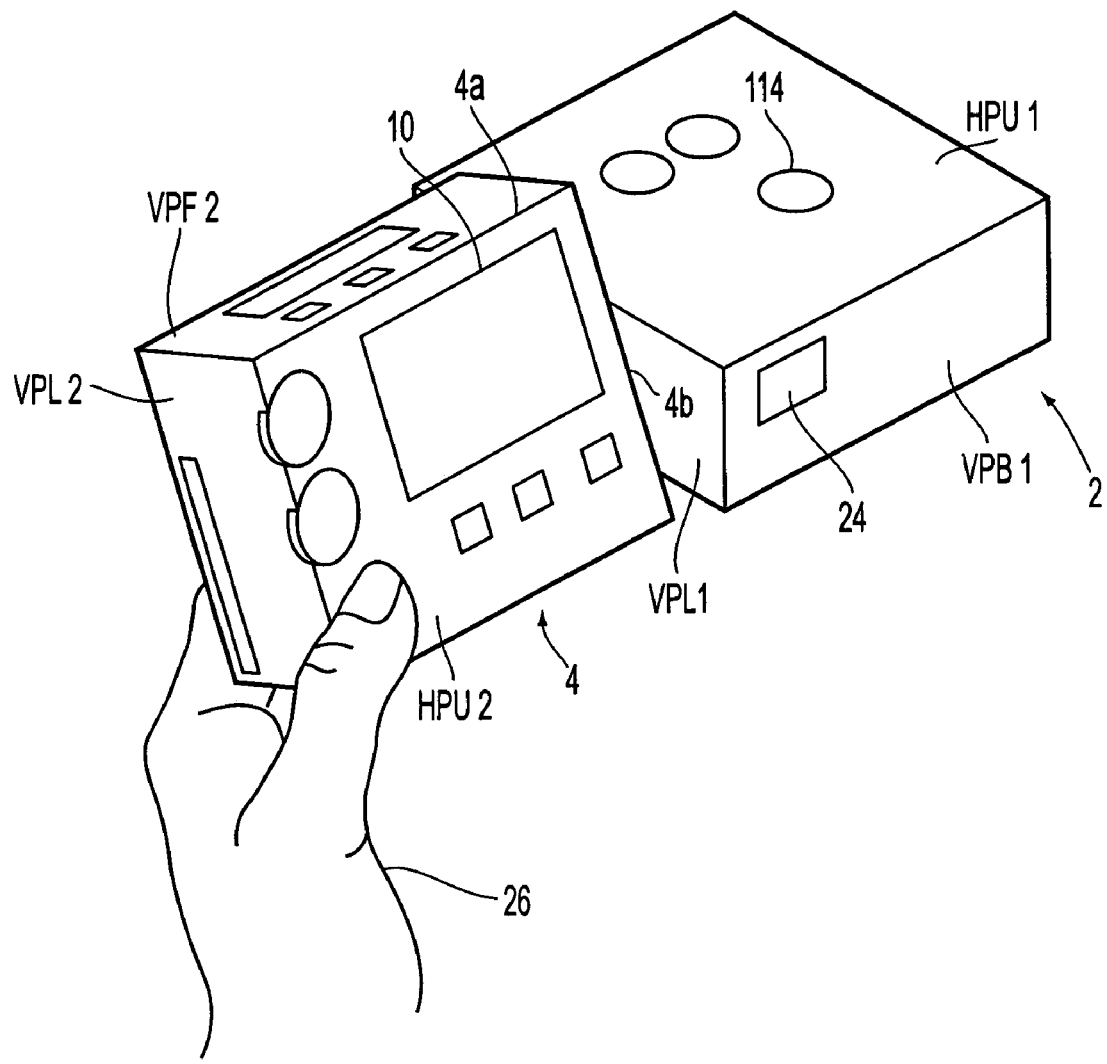
FIG. 9 is a rear surface perspective view of the FIG. 7 electronic camera.

FIG. 8 and FIG. 9 are perspective views of the rear surface of the electronic camera during use. Both figures show the second main body section 4 rotated approximately +45° in relation to the first main body section 2. As shown in these figures, optical viewfinder window 24 is positioned near the third edge 2c near the second main body section 4 side of the rear surface VPB1. Thus, the electronic camera can be positioned at approximately the center of a user's face whether viewed by the right eye or the left eye and the viewfinder is positioned in an accessible position.

Screen monitor 10 is positioned near the corner section of the second edge 4b which adjoins the first main body section 2 and first edge 4a on the front surface VPF2 side of the camera front side. This permits a space 25 to exist on the corner section of second main body section 4. This space 25 allows second main body section 4 on the left side to be firmly grasped by the left hand 26 of a user as shown in FIG. 9 and a user's right hand can be used for operating the digital camera. In FIG. 8 and FIG. 9, aperture 28 provided on the left surface VPL2, which is the left side surface of the second main body section 4, is an aperture for insertion and removal of a card-shaped memory for data recording.

Figure 10:
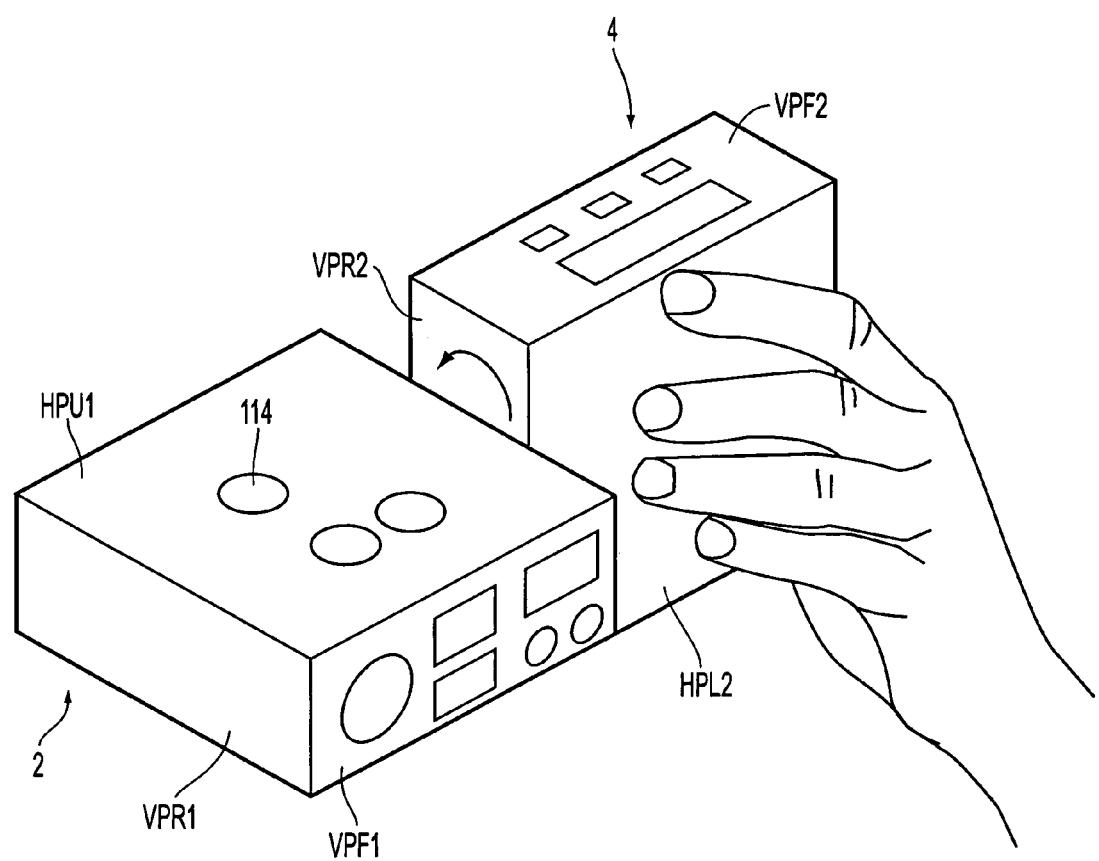
FIG. 10 is a front perspective view of the FIG. 7 electronic cam era.

FIG. 10 is a front perspective view during camera operation and shows the electronic camera when the rear surface VPB2 on the camera faces upward and is rotated approximately +90° relative to the first main body section 2. Since there are no windows or operation members on surface HPL2, a user's entire hand can be placed on the surface HPL2 providing great stability.

Figure 11:
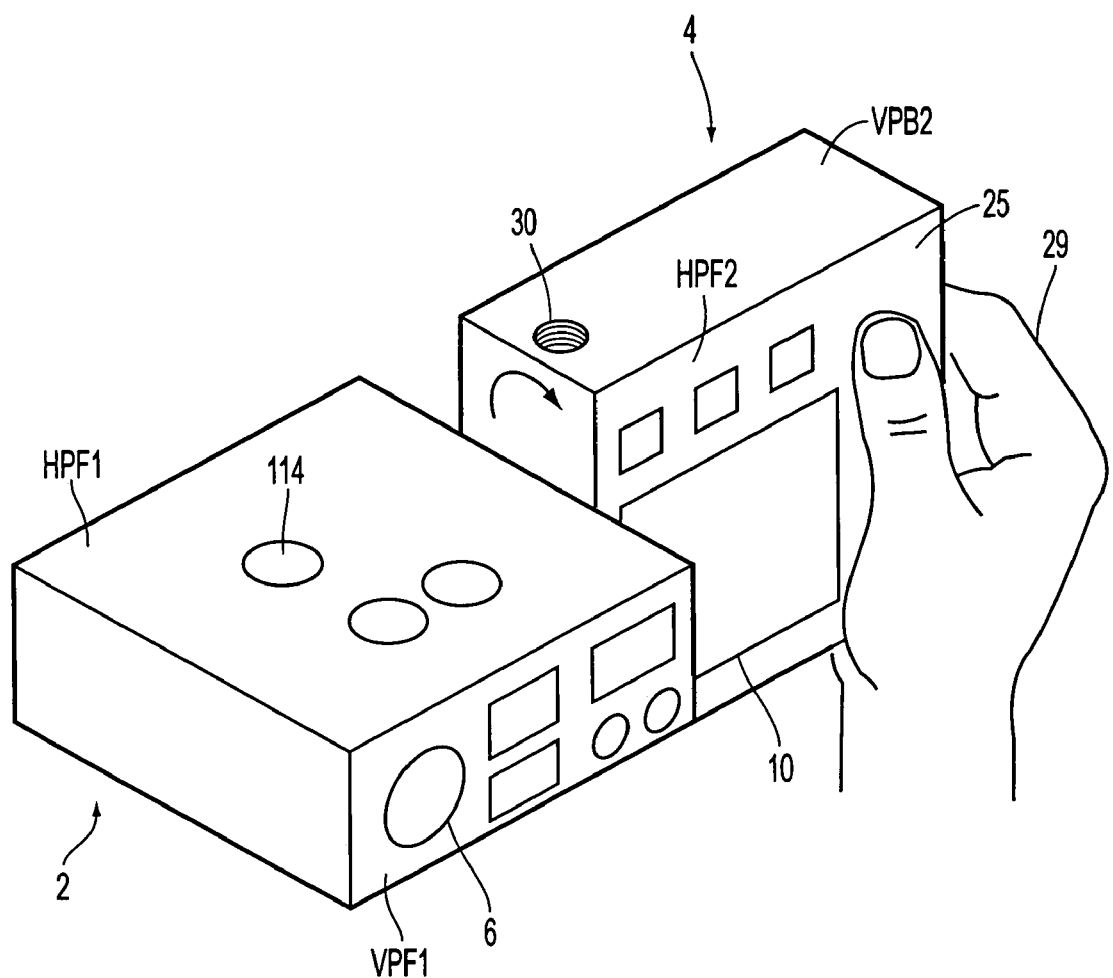
FIG. 11 is a front perspective view of the FIG. 7 electronic camera.

FIG. 11 shows a front perspective view of the electronic camera during use whereby the rear surface VPB2 of the camera faces upward and is rotated approximately −90° relative to the first main body section 2. In this position, screen monitor 10 and photographic lens aperture 6 also both face the photographer side. In this configuration a user can photograph him or herself. Since a user's right hand 29 thumb can be placed on space 25, it is possible to obtain a firm grasp of the electronic camera by grasping the second main body section 4 with the right hand 29. In this case, it is possible to also push the release button 14 with the right hand 29, and it is possible to take a self-timed photograph.

Furthermore, a tripod mounting screw or receptacle 30 can be provided at the rear perpendicular surface VPB2 of the second main body section 4.

The embodiments described above provide several advantages over the conventional electronic camera designs. For example, because the first and second main body sections 2 and 4 are constructed as two separable components, weight distribution is roughly uniform, thus improving balance when the camera is grasped. This reduces vibrations caused by hand shaking.

Since the first and second main body sections 2 and 4 establish a rotational movement axis at approximately the center section of the adjoined surfaces VPL1 and VPR2, in relation to the first main body section 2, weight balance is good even where the second main body section 4 is slanted, as shown in FIGS. 8, 9 and 10, for example.

Also, the screen monitor 10 of the second main body section 4 is arranged to approach the corner section on the second edge 4b side which adjoins the first main body section 2 and the first edge 4a of the camera front surface side. Thus, a space 25 can be provided within the upper surface HPU2 so that the second main body section 4 can be grasped by the left hand at the corner section enabling a firm grasp. Also, a user's thumb can be placed at the space 25 during photography, which improves camera stability. Furthermore, this reduces the chance that the screen monitor 10 will be covered by a user's hands.

Figure 12:
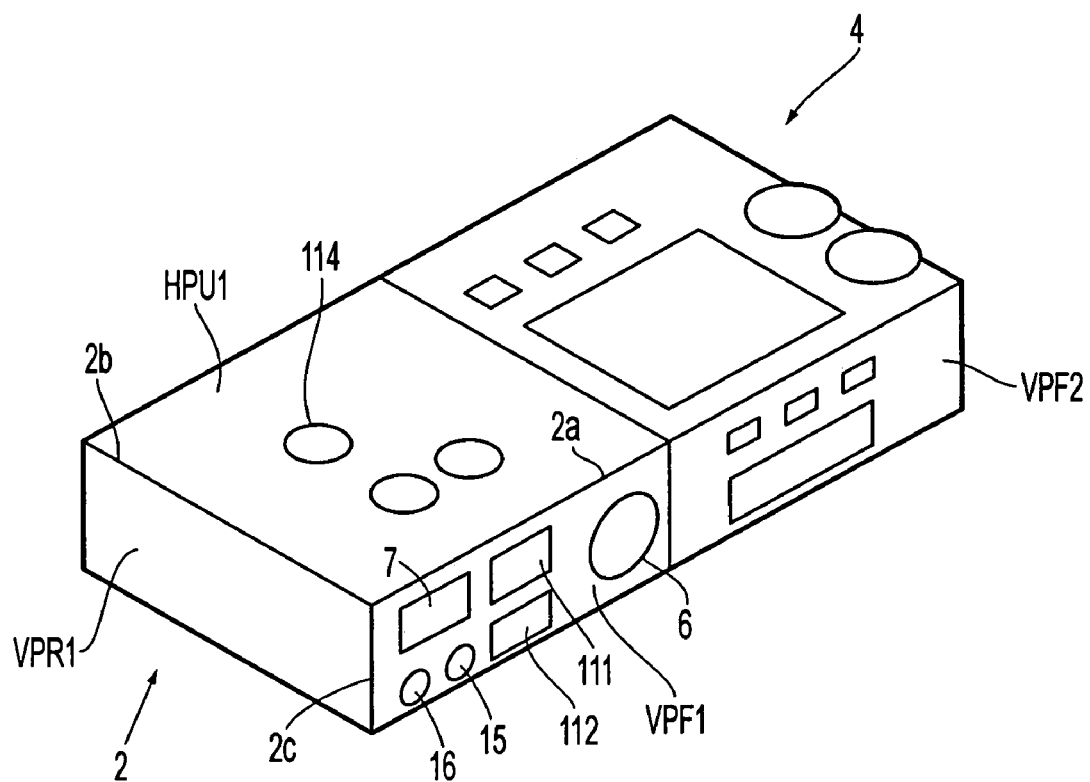
FIG. 12 is a front perspective view of the electronic camera according to another embodiment of the invention.

In addition, because optical viewfinder window 24 is near the side of the third edge 2c which adjoins the second main body section 4 within the rear surface VPB1 of the first main body section 2, the camera can be positioned near the center of a user's face whether viewed by the right or left eye. FIG. 12 shows a front perspective view of the electronic camera according to another embodiment of the invention. Front surface VPF1 is the camera front surface of the first main body section 2. Photographic lens aperture 6 is positioned near the vertical edge that adjoins the second main body section 4. Object window 7 of the optical viewfinder is near the right surface VPR1.

The location of object window 7 in FIG. 12 is such that it could be inadvertently covered by the fingers of the right hand when the camera is set up. However, this would be readily apparent as the fingers are observed through window 7. Moreover, even if optical viewfinder object window 7 is hidden by the fingers, there are absolutely no obstacles to photography. Therefore, compared to the arrangement where photographic lens aperture 6 is provided at this location, the possibility of photographic mistakes is reduced due to the unlikelihood that the fingers will be placed over the lens aperture 6 on the side of the second main body section 4 in the FIG. 12 embodiment.

Figure 13:
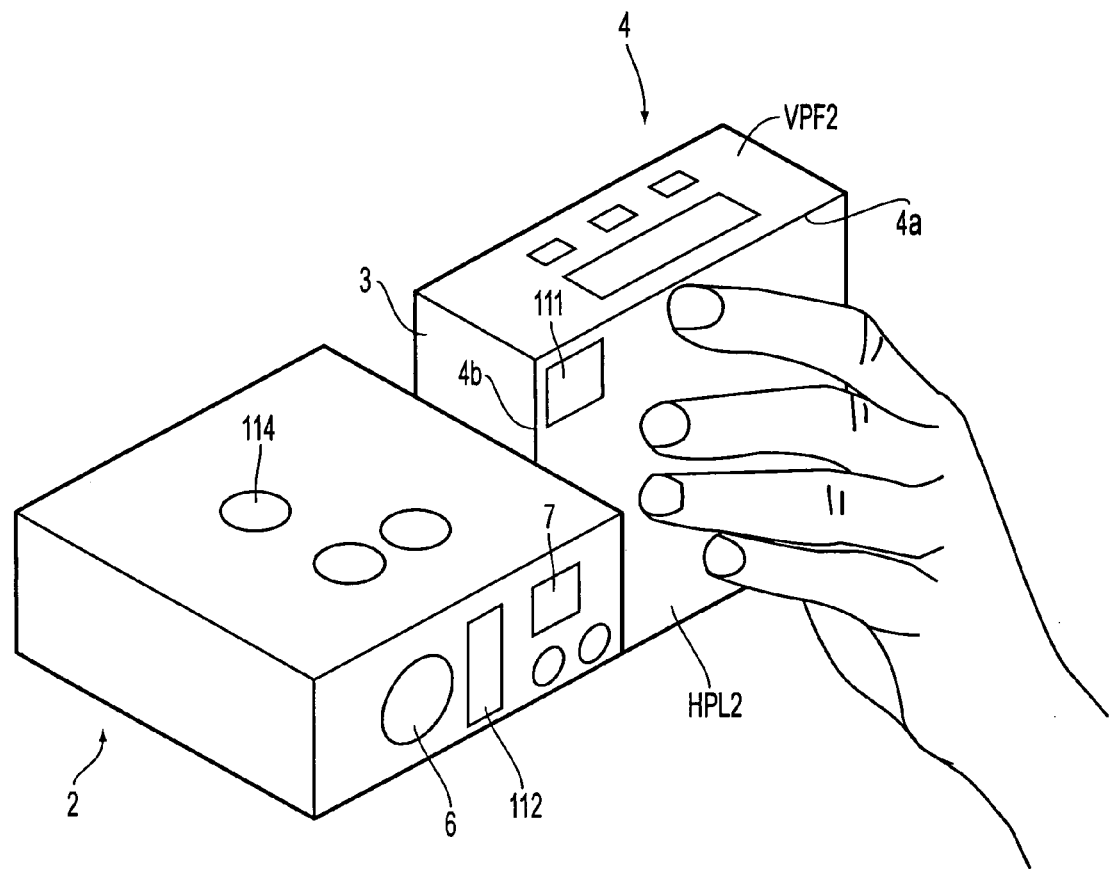
FIG. 13 is a front perspective view of the electronic cam era according to another embodiment of the invention.

FIG. 13 shows a perspective view of the electronic camera according to another embodiment. In the two previous embodiments, light emission window 111 was provided at the front surface VPF1, which includes the camera front surface of the first main body section 2. In this embodiment, the light emission window 111 of a flash device is provided on lower surface HPL2 of the second main body section near the second edge 4b that adjoins with the first main body section 2. This causes the distance between photographic lens aperture 6 and the light emission window 111 to become long, which reduces the probability that red-eye is generated.

When the photographic lens aperture 6 and flash light emission window 111 of the flash device are each positioned respectively at the first main body section 2 and the second main body section 4 so that the first and second main body sections 2 and 4 rotate, movement up and down of the light emission unit so that the light distribution of the strobe and the field angle of the photographic lens is appropriately maintained. Also, it is possible to configure the electronic camera so that flash photography is allowed only when the first main body section 2 and second main body section 4 have a prescribed angle relationship with respect to each other.

The described embodiments' therefore, provide first and second main body sections which are approximately the same size. Because the electronic camera can be easily supported. It can be in a stable operating condition, even during rotation. This reduces concerns over vibrations even with long exposure times.

Because the first and second rotation axis centers are located at approximately the center section of the surface that adjoins both sections, the weight moment becomes constant without being based on the relative rotation angles.

Since the screen monitor is arranged at a corner section from the first main body section, a space is provided where a user's entire hand may be placed permitting a firm grasp of the camera which reduces vibrations caused by hand shaking.

Figure 14:
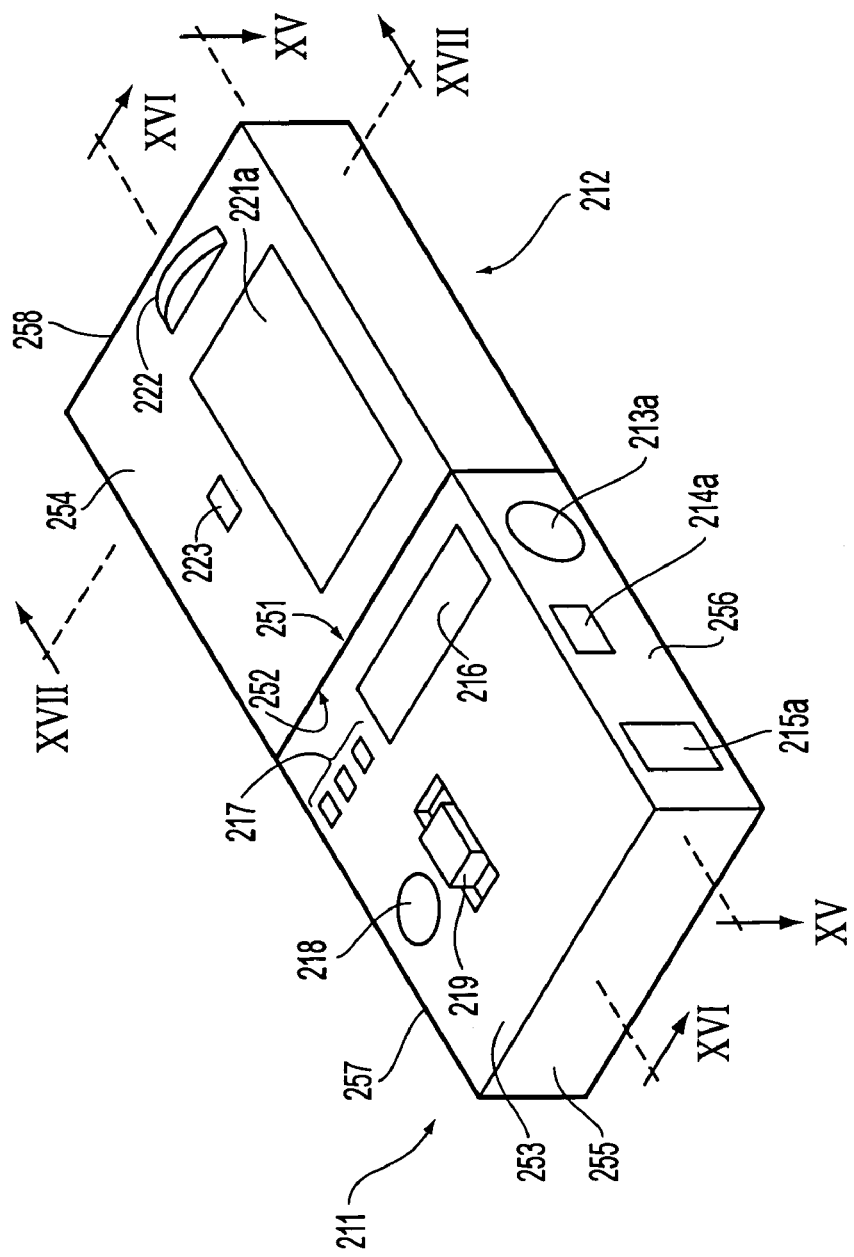
FIG. 14 is a perspective view showing the electronic camera according to yet another embodiment of the invention.
Figure 15:
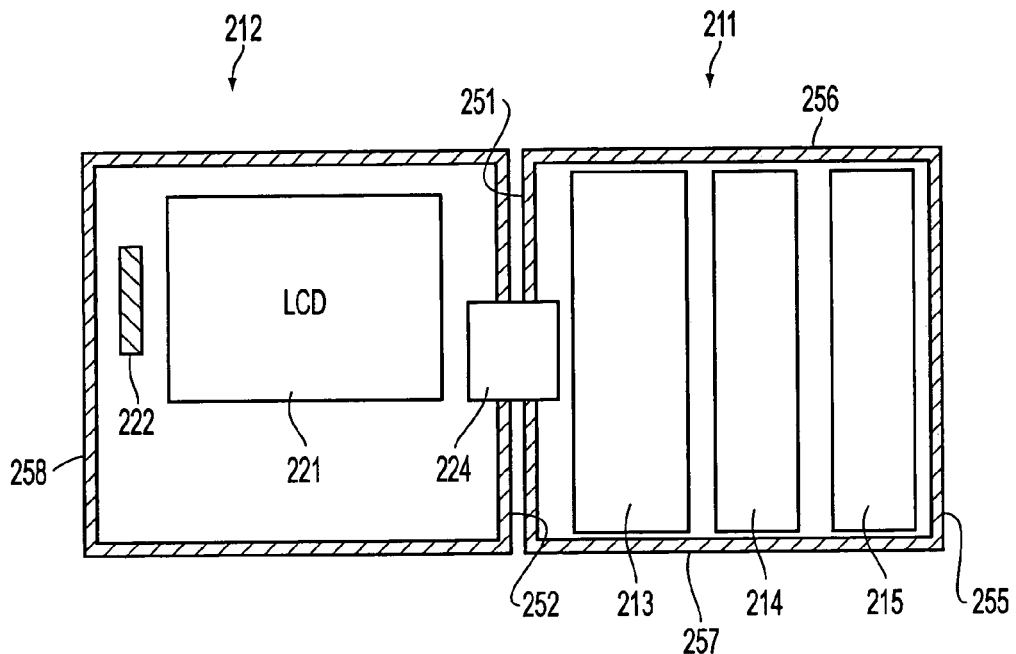
FIG. 15 shows a vertical cross-section of the FIG. 14 electronic camera according to cross-section line 2—2.

FIG. 14 shows the electronic camera according to another embodiment of the invention. The FIG. 14 camera includes an imaging unit main body 211 and display unit main body 212 which are about the same shape and size. A side face 251, i.e., the first side face of the imaging unit main body 211 and the side face 252, i.e., the second side face of the display unit main body 212 are about the same shape and size and are positioned to oppose each other. The imaging unit main body 211 and the display unit main body 212 are coupled by a rotary joint unit 224 (FIG. 15) so that they rotate freely with respect to one another around an axis perpendicular to the side faces 251 and 252.

As shown in FIG. 14, the top face 253 of the imaging unit main body 211 corresponds to a first face and the top face 254 of the display unit main body 212 corresponds to a second face.

An optical system, motor and other imaging related components can be provided in an imaging unit main body 211. The significant components include a cylindrical lens unit 213 with an imaging optical axis, an optical viewfinder unit 214 and an electronic flashing unit 215, which are positioned adjacent to the rotary joint unit 224 with both ends facing opposite side faces 256 and 257, which intersect side face 251.

This configuration permits forming the imaging unit main body 211 in a narrow shape with the width of the side faces equal to the diameter of the lens unit 213, optical viewfinder unit 214 and electronic flash unit 215.

The lens unit 213 includes a lens barrel, an imaging device (e.g., a photoelectric converter such as a CCD) and a control mechanism which changes the position of the shooting lens within the lens barrel as instructed by a zooming button 219. The shooting lens receives light through the lens aperture 213a which is formed on the side face 256.

Figure 18:
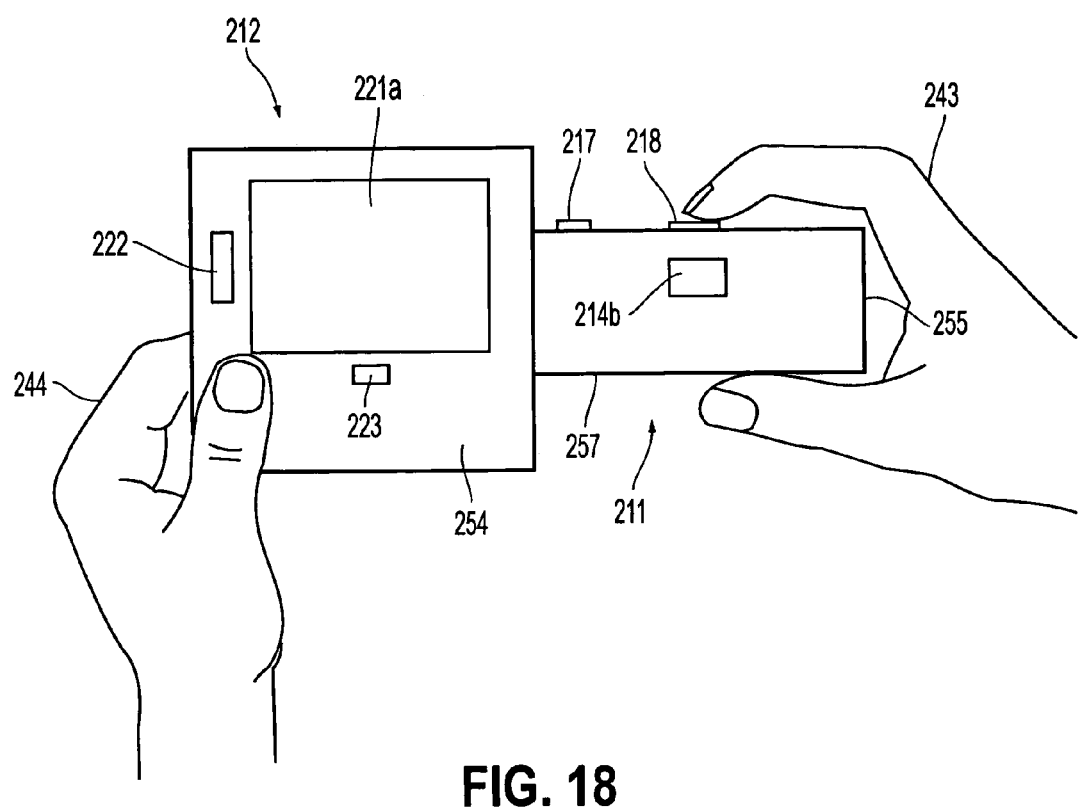
FIG. 18 shows a perspective view of the FIG. 14 electronic camera.
Figure 19:
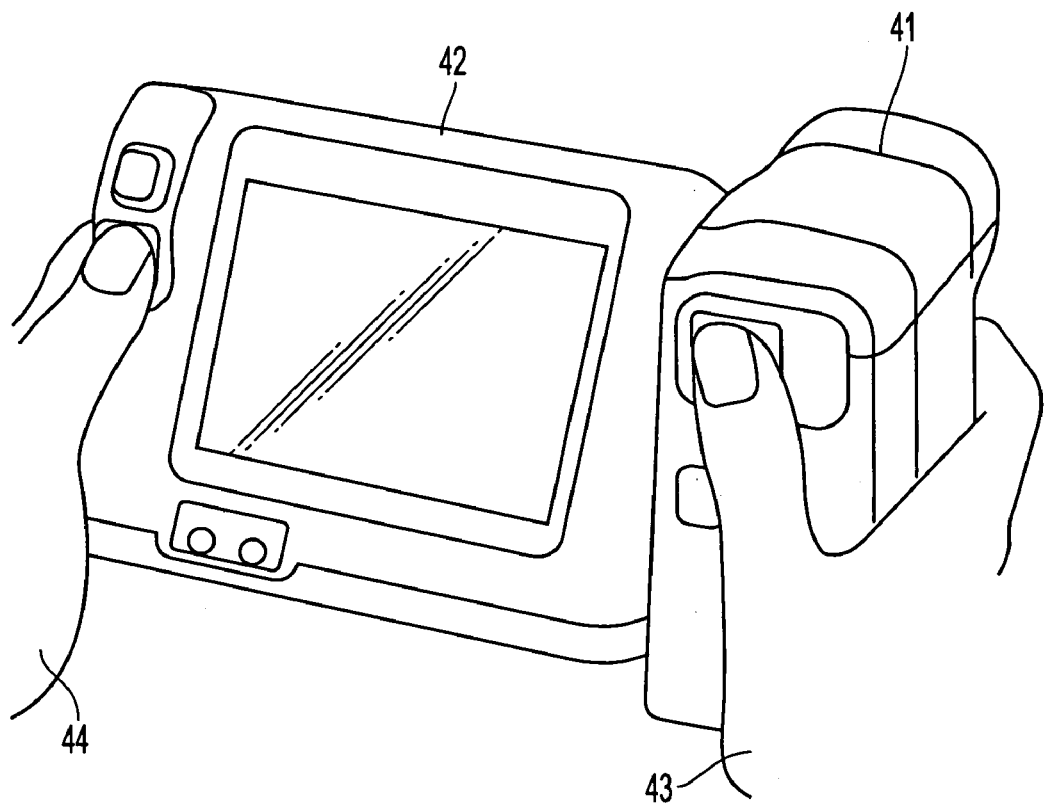
FIG. 19 shows a conventional electronic camera.

The viewfinder unit 214 indicates the shooting range for a user and includes a viewfinder object window 214a and a viewfinder eye piece window 214b as shown in FIG. 18, on side faces 256 and 257, respectively.

The electronic flash unit 215 includes a mechanism for emitting a flash of light onto an object from a light emitting unit 215a, which is positioned on the side face 256.

LCD 221, which includes an external display apparatus, is positioned on the display unit main body 212 whereby the LCD display window 221a is on the top face 254. A rotary dial 222 is positioned on surface 254 near LCD 221 and near surface 258 with a rotational axis parallel to the central axis of rotation of rotary joint unit 224. A portion of the dial circumference protrudes through the top face 254. The center of rotary dial 222 is positioned on the bisector of LCD window 221a in a direction perpendicular to the side face 252 on top face 254 of the display unit main body 212.

A circuit board 231 used for image processing is mounted within the device and a mounting chamber (unrepresented) for a removable memory card 235 is formed under LCD 221.

The LCD 221 displays images which are transmitted from the imaging unit main body 211, reproduces images which have been shot, displays the setting menus for the electronic camera and displays a table which shows the functions of the electronic camera. Reproduction of multiple images and display of the setting menu are executed by vertical scrolling and/or advancement of frames which makes setting selection by a user easier.

The rotary dial 222 is a rotary operation member for switching the display screen of LCD 221. It is initially set so that the direction of the rotary operation and the direction of display screen scroll coincide. Thus, the display screen scrolls upward as the rotary dial 222 is rotated upward and the display screen scrolls downward as the rotary dial 222 is rotated downward.

The scrolling velocity of the display screen corresponds to the velocity at which the rotary dial 222 is rotated. Also, the rotary dial 222 can be push operated and may be set to verify the display screen.

The rotary joint unit 224 is made of cylindrical members, which are anchored, for example, on the center of the side surfaces 251 and 252 of the imaging unit main body 211 and the display unit main body 212. The cylindrical members are attached in a manner that allows free rotation between the cylindrical members. A connection line for electrically connecting the structural components in the imaging unit main body 211 and the structural components in the display unit main body 212 is inserted through the hollow unit of the cylindrical members of the rotary joint unit 224. A rotary intermittent motion mechanism which uses friction and ball bearings, for example, is provided in the fitting portion in order to stabilize the rotational angle to a desired angle. In this fitting unit, a stopper may be provided to limit the rotational range.

Also, on the top face 253 of the imaging unit main body 211, a display window 216 and a setting button 217 are positioned side by side above the lens unit 213. A release button 218 and a zooming button 219 are also positioned side by side in this order at a position closer to the side face 255, which faces opposite side face 251, and towards the center of top face 253 through the vicinity of side face 257.

Shooting information, including the shooting mode setting state and the number of shooting frames of the electronic camera are displayed on the LCD display. The setting button 217 includes a series of buttons for setting or releasing the shooting mode of the electronic camera.

A slide type switch which is positioned so as to slide in the lengthwise direction of the electronic camera functions as a zooming button 219. Zooming button 219 changes the arrangement position of the shooting lens in the lens unit 213 in such a manner that the shooting mode is neutral when the operation edge of the zooming button 219 is in the center, is wide when retracted, and is telescopic when extended.

Figure 16:
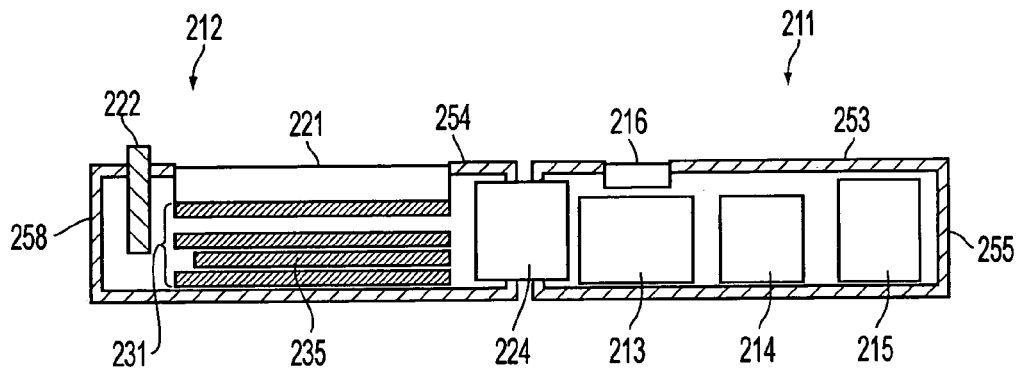
FIG. 16 shows a vertical cross-section of the FIG. 14 electronic camera according to cross-section line 3—3.
Figure 17:
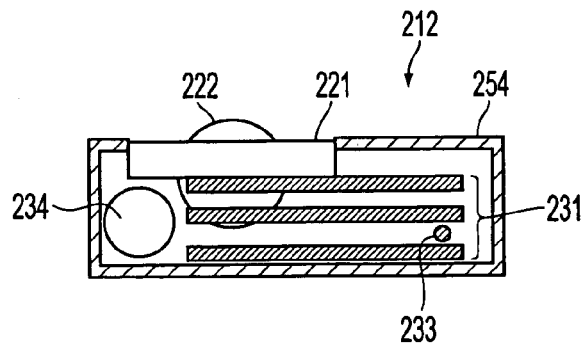
FIG. 17 shows a horizontal cross-section of FIG. 14 electronic camera according to cross-section line 4—4.

The element 223 shown in FIG. 14 is a button for switching LCD 221 on and off. The elements 233 and 234 shown in FIGS. 16 and 17 are a power source terminal and a battery, respectively.

Operation of the electronic camera will be described in detail with reference to FIG. 18. FIG. 18 shows the electronic camera when a user is shooting an object directly in front of the camera. Prior to shooting an image, the user sets the camera operations with the setting button 217, while verifying the position of the electronic camera from the display window 216.

Next, because the electronic camera is wider in a horizontal direction, a user holds the imaging unit main body with a right hand 243, and while supporting the display unit main body 212 with a left hand 244, the user turns the lens aperture 213*a* towards the object to be imaged. The user can verify the object position through the display screen positioned on the top face 253 of the display unit main body 212 or through the viewfinder eye piece window 214*b* which is formed on the side face 257 located on the front side of the imaging unit main body 211.

The lens unit 213, which is the heaviest component in the imaging unit main body 211 is positioned in the vicinity of the point where the display unit main body 212 is joined to the imaging unit main body 211. Thus, the camera's center of gravity is located at its center, allowing the electronic camera to be held stably.

At this time, the user can close the shutter by pressing release button 218. A user's right middle finger may be positioned in the vicinity of the zooming button 219 and thus it is most natural for the middle finger to rest on the zooming button 219. The user's remaining right fingers are not positioned near any buttons and are left free to move without performing any operations.

A setting button 217, which is not used during shooting, is also positioned in the vicinity of the joint unit 224 above the lens unit 213. Thus, a user operating the camera to capture an image cannot easily touch or interfere with the setting button 217. Thus, the chance of accidentally changing the shooting mode of the electronic camera through accidental contact with setting button 217 is eliminated.

Contact of a user's hands with the display window 216 should also be avoided to prevent soiling of the window with finger prints, for example. Because the display window 216 is positioned, like the setting button 217, in a location where a user's fingers are hard to reach, the probability of contact is very small.

Another mistake that a user should avoid is the mistake of the right ring finger making contact with the lens aperture 213*a* or of fingers covering the lens aperture 213*a*. This problem is also avoided because the lens aperture 213*a* is configured in the position closest to the joint portion and thus, the probability of covering the lens aperture 213*a* is very small compared to the probability of covering the light emitting window 215*a* or the viewfinder object window 214*a*.

Thus, the electronic camera according to this aspect of the invention provides numerous advantages over the conventional art. Various mistakes which arise during shooting are reduced or eliminated, allowing a user to concentrate on shooting. Also, in executing telescopic shooting or wide angle shooting, the sliding operation of the zooming button 219 may be executed using the middle finger while supporting the electronic camera with the pointing finger touching the release button 218.

The invention also reduces the probability of red-eye substantially when shooting people or animals because the light emitting window 215*a* is separated from the lens aperture 213*a* by at least the width of the viewfinder object window 214*a*. Also, when shooting with a flash, the electromagnetic waves generated by the electronic flash unit 215 may enter as noise into the transmission path of the image signals, adversely affecting signal quality. However, this problem is limited by the invention because the electronic flash unit 215 is isolated by the optical viewfinder unit. A user can also display and verify a plurality of images being shot on the display unit main body 212.

The rotary dial 222, which allows switching between the image displayed on the screen is positioned left of LCD display window 221*a*. Thus, accidental contact with the LCD display window 221*a* is avoided and the rotary operation may be executed by the left thumb. Moreover, rotary operation in this direction is a more natural movement with a left hand holding the display unit main body 212. When scrolling the screen, the movement of the rotary dial 222 and the display screen coincide, allowing the user to observe and alter the scroll direction intuitively. This allows easy manipulation of the display. Also, a user may make a selection at a desired speed because the velocity of the rotary feature is adjustable and corresponds to the movement of the rotary dial, which is controlled by the user. According to the invention, the image can be displayed, a menu of settings can be displayed and both can be scrolled by operating a rotary dial.

The embodiments described discuss the features of the invention in the context of a digital still camera. However, the invention's features are equally applicable to a video camera whereby an imaging button is operated for start and completion of shooting in place of the release button 218. The zooming button can be used as a switching button for switching between zooming up, zooming back and neutral operations.

In the embodiments described above, the zooming button was formed as a slide type switch, however, any type of switch, such as a rocker type switch, for example, may be utilized. Also, in the embodiment described above, the zooming button is made to switch zooming methods, however the amount and speed of zooming may also vary continuously.

The imaging unit main body 211 and the display unit main body 212 may be formed in a box-like shape and size. The imaging unit main body 211 may also be formed as a thin body with the distance between the top face and the bottom face being determined based on the diameter of the lens unit. The display unit main body may be any thin shape as long as the face displaying the screen is sufficiently wide.

As described above, the electronic camera according to an embodiment of the invention includes a lens unit and an optical viewfinder unit which are positioned side by side in a direction along a first side face, and a first face which is perpendicular to the first side face. Thus, the imaging unit main body may be formed with a side face thinner than the first face, which simplifies the overall shape. Also, the lens unit is positioned close to the rotary section, thus assuring stability. The lens aperture should also be arranged in the vicinity of the rotary section, which is farthest away from the support position, thus reducing the probability of imaging failure due to a user's fingers covering the lens aperture.

The electronic camera, according to an embodiment of the invention also includes a lens unit, an optical viewfinder and an electronic flash unit, which are arranged side by side along the first face. Thus, flash shooting of a still picture is possible while the imaging unit main body is maintained thin with a smaller side face than the first face because the aperture of the electronic flash unit is arranged away from the aperture of the lens unit which reduces the possibility of red-eye. Because the electronic flash unit and the lens unit are separated, the entry of noise into the image information caused by the emission of flash light may be limited.

According to another aspect of the invention, the display window and the setting button may be positioned in the vicinity of the rotary section which is away from the support position. Thus, the probability of a user's fingers making contact with the display window and the setting button is very small.

The display window and the setting button may be arranged in the direction of intersection of the first face and the first side face.

A user can rotate the rotary operation member while holding the display unit main body from the opposing face. Thus, both apparatus support and the switching of the screen display may be reliably executed. Moreover, the direction of the rotary operation of the rotary operation member coincides with the scroll direction of the display screen. A user can, therefore, scroll almost automatically to a desired direction.

The rotary operation member may be arranged on the line segment bisecting the scroll direction of the length of the display screen. Thus, the length direction of the rotary operation member lines up along the side the display screen.

The imaging unit main body and the display unit main body can be formed to be nearly the same box-like shape and size, thus providing a balance between the two sections.

Thus, by optimizing the arrangement of main components of an electronic camera, an electronic camera with superior operability which is convenient for storage and carrying may be realized. Thus, a user is always able to photograph and review images with a stable device.

While the invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An electronic camera, comprising:
    a first main body section and a second main body section, said first and second main body sections each having upper and lower surfaces delimited by first and second edges, front and rear surfaces delimited by the first edges and third edges, and right and left surfaces delimited by the second and third edges, respectively, said first and second main body sections having approximately the same size and being rotatably coupled to each other by respective right and left surfaces thereof;
    an optical viewfinder object window disposed on said front surface of said first main body section;
    a photographic lens aperture disposed on said front surface of said first main body section; and
    a screen monitor disposed on said upper surface of said second main body section.

2. The electronic camera according to claim 1, wherein a relative axis of rotation of said first and second main body sections is located approximately at a central portion of said right and left surfaces.

3. The electronic camera according to claim 1, wherein:
    said screen monitor is disposed near a corner section of said upper surface adjacent to said front surface and said first main body section; and
    a finger rest is positioned on a corner section of said second main body section diametrically opposed to said screen monitor.

4. The electronic camera according to claim 1, wherein an ocular window of said optical viewfinder is disposed on the rear surface of said first main body section near the second main body section.

5. The electronic camera according to claim 1, further comprising a flash device and a range finder in said first main body section, wherein apertures of said flash device and of said range finder are located in the front surface of said first main body section.

6. The electronic camera according to claim 1, further comprising a flash device and a focus detection device provided in said first main body section, wherein apertures of said flash device and of said focus detection device are located in the front surface of said first main body section.

7. The electronic camera according to claim 1, further comprising a release button provided on said upper surface of said first main body section.

8. The electronic camera according to claim 1, wherein a length of said first edge of said first and second main body sections is between 40 and 80 mm.

9. An electronic camera comprising:
    an imaging unit main body including a first face and a first side face which intersects said first face;
    a display unit main body including a second face, a second side face which is perpendicular to said second face, and an external display apparatus on said second face;
    said first side face rotatably coupled to said second side face so that said display unit main body and said imaging unit main body are rotatable relative to each other about an axis of rotation; and
    a lens unit mounted near the first side face and an optical viewfinder unit in the imaging unit main body, each having an optical axis parallel to the first side face, the imaging unit main body having an opposing side face that faces in an opposite direction than said first side face, the lens unit disposed closer to the first side face than is the optical viewfinder unit, the optical viewfinder unit disposed closer to the opposing side face than is the lens unit.

10. The electronic camera according to claim 9, further comprising an electronic flash unit arranged between said optical viewfinder unit and said opposing side face.

11. The electronic camera according to claim 9, further comprising a display window for displaying the status of the electronic camera, said display window arranged on said first face over said lens unit.

12. The electronic camera according to claim 9, further comprising a setting button for setting a control state of the electronic camera, said setting button arranged on said first face over said lens unit.

13. The electronic camera according to claim 9, further comprising:
    a display window for displaying the status of the electronic camera; and
    a setting button for setting a control state of the electronic camera;
    wherein said display window and said setting button are arranged on said first face over said lens unit.

14. The electronic camera according to claim 13, further comprising:
an imaging button and a zoom button, both buttons disposed on said first face at positions closer to said opposing side face than said display window and said setting button.

15. The electronic camera according to claim 9, wherein said imaging unit main body and said display unit main body have substantially the same parallelepiped shape and size.

16. An electronic camera comprising:
an imaging unit main body including a first face and a first side face which intersects said first face;
a display unit main body including a second face, a second side face which is perpendicular to said second face, and an external display apparatus on said second face;
said first side face rotatably coupled to said second side face so that said display unit main body and said imaging unit main body are rotatable relative to each other about an axis of rotation; and
a rotary operation member on a portion of said second face of said display unit main body that is located adjacent to an opposing side face of said display unit main body that faces in an opposite direction than said second side face, said rotary operation member scrolling a display screen of said external display apparatus in a scrolling direction.

17. The electronic camera according to claim 16, wherein said rotary operation member is located on a side of the external display apparatus along a bisector of said display screen in the scrolling direction.

18. The electronic camera according to claim 16, wherein said imaging unit main body and said display unit main body have substantially the same parallelepiped shape and size.

19. The electronic camera according to claim 16, wherein said rotary operation member rotates in the scrolling direction.

20. An electronic camera comprising:
an imaging unit main body including a first face and a first side face which intersects said first face;
a display unit main body including a second face, a second side face which is perpendicular to said second face, and an external display apparatus on said second face;
said first side face rotatably coupled to said second side face so that said display unit main body and said imaging unit main body are rotatable relative to each other about an axis of rotation; and
a lens unit mounted near the first side face and an electronic flash unit in the imaging unit main body, the imaging unit main body having an opposing side face that faces in an opposite direction than said first side face, the lens unit disposed closer to the first side face than is the electronic flash unit, the electronic flash unit disposed closer to the opposing side face than is the lens unit.

* * * * *